United States Patent
Fujiwara

(10) Patent No.: US 7,742,194 B2
(45) Date of Patent: Jun. 22, 2010

(54) IMAGE PROCESSING DEVICE, IMAGE PROCESSING METHOD, IMAGE FORMING APPARATUS, IMAGE PROCESSING PROGRAM, AND STORAGE MEDIUM

(75) Inventor: Michiko Fujiwara, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 568 days.

(21) Appl. No.: 11/783,074

(22) Filed: Apr. 5, 2007

(65) Prior Publication Data

US 2007/0242294 A1 Oct. 18, 2007

(30) Foreign Application Priority Data

Apr. 18, 2006 (JP) .............................. 2006-115027

(51) Int. Cl.
G03F 3/08 (2006.01)

(52) U.S. Cl. .................... 358/1.9; 358/464; 358/518

(58) Field of Classification Search ................. 358/1.9, 358/1.1, 3.23, 464, 518, 523; 382/162, 167
See application file for complete search history.

(56) References Cited

U.S. PATENT DOCUMENTS

| | | | | |
|---|---|---|---|---|
| 5,850,298 | A * | 12/1998 | Narahara et al. | 358/518 |
| 6,473,194 | B1 * | 10/2002 | Sakai | 358/1.17 |
| 2003/0210411 | A1 | 11/2003 | Takayuki | |
| 2003/0227468 | A1 * | 12/2003 | Takeda | 345/619 |
| 2005/0265600 | A1 * | 12/2005 | Li et al. | 382/170 |

FOREIGN PATENT DOCUMENTS

| | | |
|---|---|---|
| JP | 2003-153022 A | 5/2003 |
| JP | 2004-23771 A | 1/2004 |
| JP | 2006-94039 A | 4/2006 |

* cited by examiner

Primary Examiner—Thomas D Lee
(74) Attorney, Agent, or Firm—Birch, Stewart, Kolasch & Birch, LLP

(57) ABSTRACT

The present invention includes a plurality of color correction tables respectively corresponding to a plurality of groups into which a page-background color is sorted. It is determined which group a page-background color of image data in a block that belongs to a page-background region belongs to. Consequently, color correction processing is performed by using a color correction table corresponding to the group determined. This makes it possible to carry out appropriate color correction processing according to the page-background color of an original document.

8 Claims, 14 Drawing Sheets

FIG. 6 (a)
1 PIXEL
| 0 | 1 | 3 | 1 | 0 |
|---|---|---|---|---|
| 1 | 3 | 5 | 3 | 1 |
| 0 | 1 | 3 | 1 | 0 |
FIG. 6 (b)
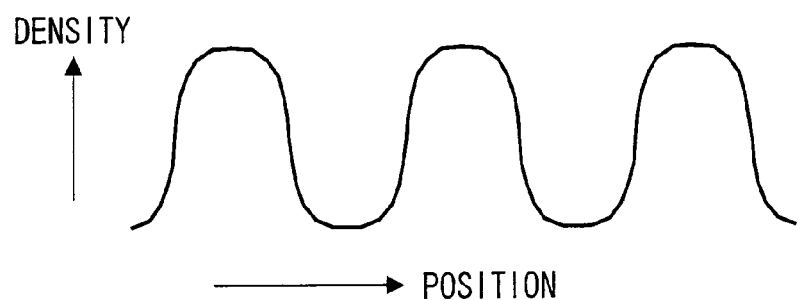
FIG. 7 (a)
1 PIXEL
| 1 | 1 | 2 | 2 | 1 |
|---|---|---|---|---|
| 1 | 2 | 3 | 1 | 1 |
| 1 | 1 | 1 | 2 | 1 |
FIG. 7 (b)
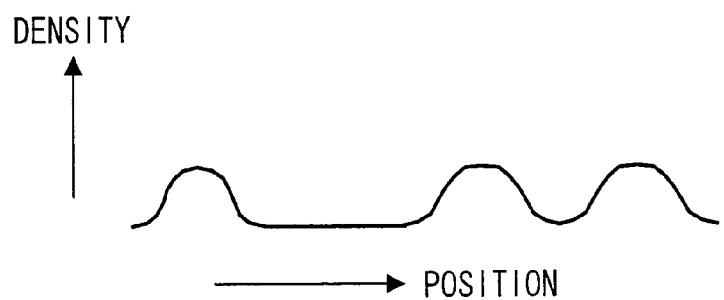

PAGE-BACKGROUND COLOR REMOVAL : STRONG
PAGE-BACKGROUND COLOR REMOVAL : WEAK
NO PAGE-BACKGROUND COLOR REMOVAL

IMAGE PROCESSING DEVICE, IMAGE PROCESSING METHOD, IMAGE FORMING APPARATUS, IMAGE PROCESSING PROGRAM, AND STORAGE MEDIUM

This Nonprovisional application claims priority under 35 U.S.C. §119(a) on Patent Application No. 115027/2006 filed in Japan on Apr. 18, 2006, the entire contents of which are hereby incorporated by reference.

FIELD OF THE INVENTION

The present invention relates to an image processing device, an image processing method, an image forming apparatus, an image processing program, and a storage medium containing the program, each for performing (i) page-background color removal processing and (ii) color correction processing with respect to image data read from an original document.

BACKGROUND OF THE INVENTION

In recent years, OA equipment digitalization has developed, and moreover, demand for color image output has increased. This has led to wide prevalence of an image forming apparatus such as an electrophotgraphic digital color copying machine, an electrophotgraphic complex machine, an ink jet color printer, or a thermal transfer color printer. For example, these image forming apparatuses are used for outputting image data or the like inputted into the image forming apparatuses from an image input device such as a scanner.

These image forming apparatuses need to output an image that properly reproduces a color of the image data inputted into the image forming apparatuses from the image input device or the like. Accordingly, color correction processing in which a digital image processing technique is used serves an important role in an image processing device for use in an image forming apparatus.

However, it is very troublesome work for an operator to set parameters for the color correction processing with respect to each original document. Moreover, in case, for example, the operator chooses an improper parameter, it is necessary to carry out another image formation after a parameter is newly set. This also means useless copy will be produced.

In an arrangement proposed for overcoming such a problem, a color correction processing is performed automatically.

For example, Patent Document 1 (Japanese Unexamined Patent Publication No. 153022/2003 (Tokukai 2003-153022) published on May 23, 2003) discloses a technique of (i) preparing in advance a look-up table storing color correction data and (ii), with reference to this look-up table, converting image data made of colors in a first color space into image data made of colors in a second color space.

Patent Document 2 (Japanese Unexamined Patent Publication No. 23771/2004 (Tokukai 2004-23771) published on Jan. 22, 2004) discloses a technique of (i) preparing a correction table on the basis of (a) a page-background color of an original document from which image data is read and (b) a page-background color of a recording sheet on which the image read from the original document is formed and (ii) performing a color correction processing according to the correction table thus prepared. Specifically, in Patent Document 2, the correction table is prepared so that a color correction processing is carried out in such a manner that (a) a color correction causing the page-background color of the original document to become visually recognized as an achromatic color is combined with (b) a color correction causing the page-background color of the recording sheet to become visually recognized as an achromatic color.

In contrast, the technique disclosed in Patent Document 1 performs a color correction processing with the use of a single look-up table no matter what color the page-background color of the original document is. Consequently, in a case where a page-background color removal is carried out, a color taste of a color which the user wishes it to stay unchanged changes largely. As a result, there arises a problem that a proper color reproduction becomes impossible. Especially, in a case of processing a light color image formed on a deep page-background color, a color reproducibility tends to deteriorate due to influence of the page-background color removal processing. Specifically, for example, a light pink image formed on a thick yellow page-background color may be reproduced as an orange image.

In Patent Document 2, since a color correction processing is carried out in such a manner that (a) a color correction causing the page-background color of the original document to become visually recognized as an achromatic color is combined with (b) a color correction causing the page-background color of the recording sheet to become visually recognized as an achromatic color, the technique of Patent Document 2, as well as the Patent Document 1, may reproduce a color improperly, depending on a combination of a page-background color of the original document and a page-background color of the recording sheet. Furthermore, the technique disclosed in Patent Document 2 requires, for each image formation, (i) operation of reading an image on the original document and the recording sheet and (ii) preparation of a correction table by identifying each page-background color of the original document and the recording sheet. This gives rise to problems such as an increase in complication of a device arrangement, an increase in size of the device, an increase in processing time, and an increase in power consumption.

SUMMARY OF THE INVENTION

The present invention is attained in view of the problems mentioned above. An object of the present invention is to provide an image processing device, an image processing method, an image forming apparatus, an image processing program, and a storage medium containing the program, each of which performs proper color correction processing in accordance with a page-background color of an original document so as to enhance color reproducibility.

According to the present invention, in order to solve the problem mentioned above, an image processing device which subjects image data read from an original document to image processing according to a page-background color of the original document, includes: a page-background color removal section which removes the page-background color from the image data; a page-background color determination section which sorts the image data into either one of a plurality of groups according to the page-background color of the original document; a plurality of color correction tables being provided so as to respectively correspond to respective page-background colors of the groups, each of the color correction tables having (a) image data before subjected to color correction and (b) image data after subjected to color correction, which are associated with each other; and a color correction processing section which subjects the image data to color correction by using a color correction table, among the color correction tables, corresponding to the group into which the image data is sorted by the page-background color determination section.

According to the above-mentioned arrangement, the image processing device includes a plurality of color correction tables which are provided so as to respectively correspond to respective page-background colors of the groups. This makes it possible to set the color correction tables, in consideration of influence of the page-background color removal processing on a color other than the page-background color in the image data for each of the groups of the original document page-background colors. Accordingly, the page-background color determination section sorts the image data into either one of the plurality of groups in accordance with the original document page-background color, and the color correction processing section carries out the color correction processing by using a color correction table corresponding to the group into which the image data is sorted. As a result, it becomes possible to suppress a change of a color other than the page-background color due to the page-background color removal processing and thus improve color reproducibility.

According to the present invention, in order to solve the problem mentioned above, an image processing method of subjecting image data read from an original document to image processing according to a page-background color of the original document, includes: a page-background color removal step of removing the page-background color from the image data; a page-background color determination step of sorting the image data into either one of a plurality of groups according to the page-background color of the original document; and a color correction step of subjecting the image data to color correction by using a color correction table corresponding to the group into which the image data has been sorted in the page-background color determination step among a plurality of color correction tables being provided so as to respectively correspond to respective page-background colors of the groups, each of the color correction tables having (a) image data before subjected to color correction and (b) image data after subjected to color correction, which are associated with each other. Therefore, the image processing method has the same effect as the above-mentioned image processing device.

An image forming apparatus of the present invention includes the above-mentioned image processing devices. Therefore, the image forming apparatus has the same effect as the above-mentioned image processing device.

The image processing device of the present invention may be realized by a computer. In such a case, a scope of the present invention includes: an image processing program for causing a computer to operate as the page-background color removal section, the page-background color determination section, and the color correction processing section so as to cause the computer to realize the image processing device; and a computer-readable storage medium which stores the image processing program.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory diagram of density values of pixels close to one halftone dot in a region including a first halftone dot pixel (halftone dot).

FIG. 6(b) is an explanatory diagram of a change in density in the region including the first halftone dot pixel.

FIG. 7(a) is an explanatory diagram of density values of pixels close to one halftone dot in a region including a second halftone dot pixel (halftone dot).

FIG. 7(b) is an explanatory diagram of a change in density in the region including the second halftone dot pixel.

FIG. 15 is a block diagram illustrating an arrangement of a color correction section included in the image processing device illustrated in. FIG. 2.

DESCRIPTION OF THE EMBODIMENTS

An embodiment of the present invention is explained below. Explained in this embodiment is a case where an image processing device of the present invention is applied to a digital color copying machine (image forming apparatus).

(1-1. Color Image Processing Device 2)

Figure 1:
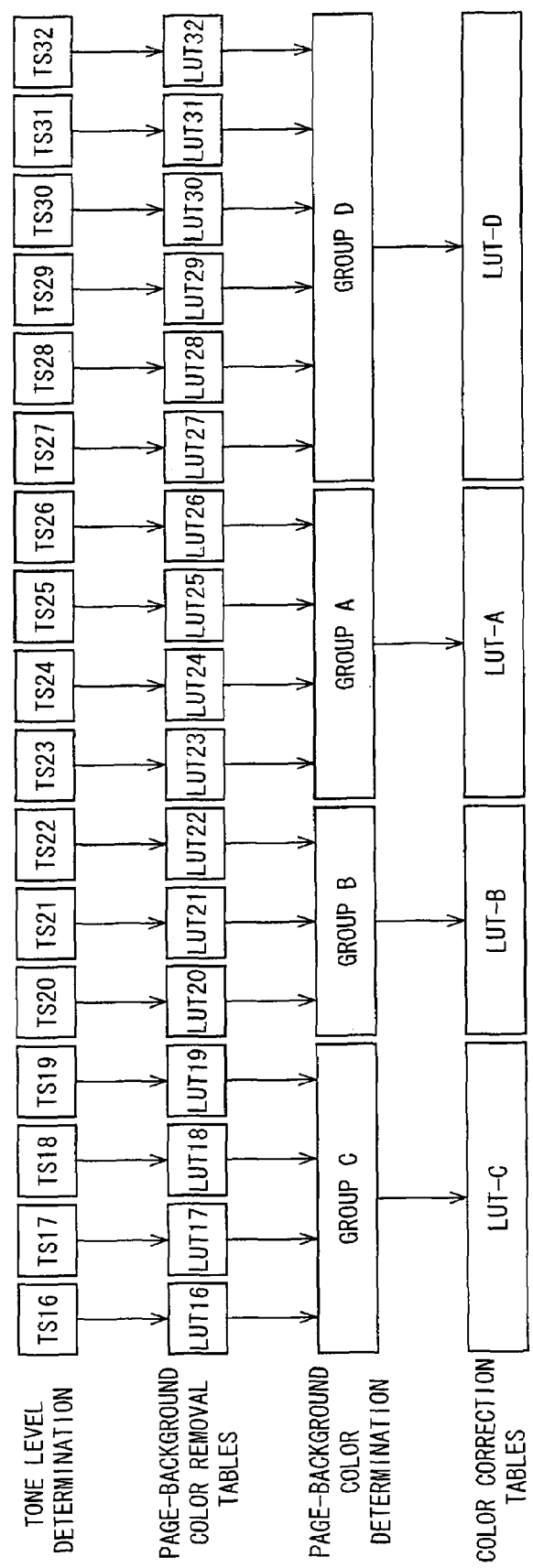
FIG. 1 is an explanatory diagram illustrating a method of choosing a look-up table used for page-background color removal processing and color correction processing in an image processing device according to an embodiment of the present invention.
Figure 2:
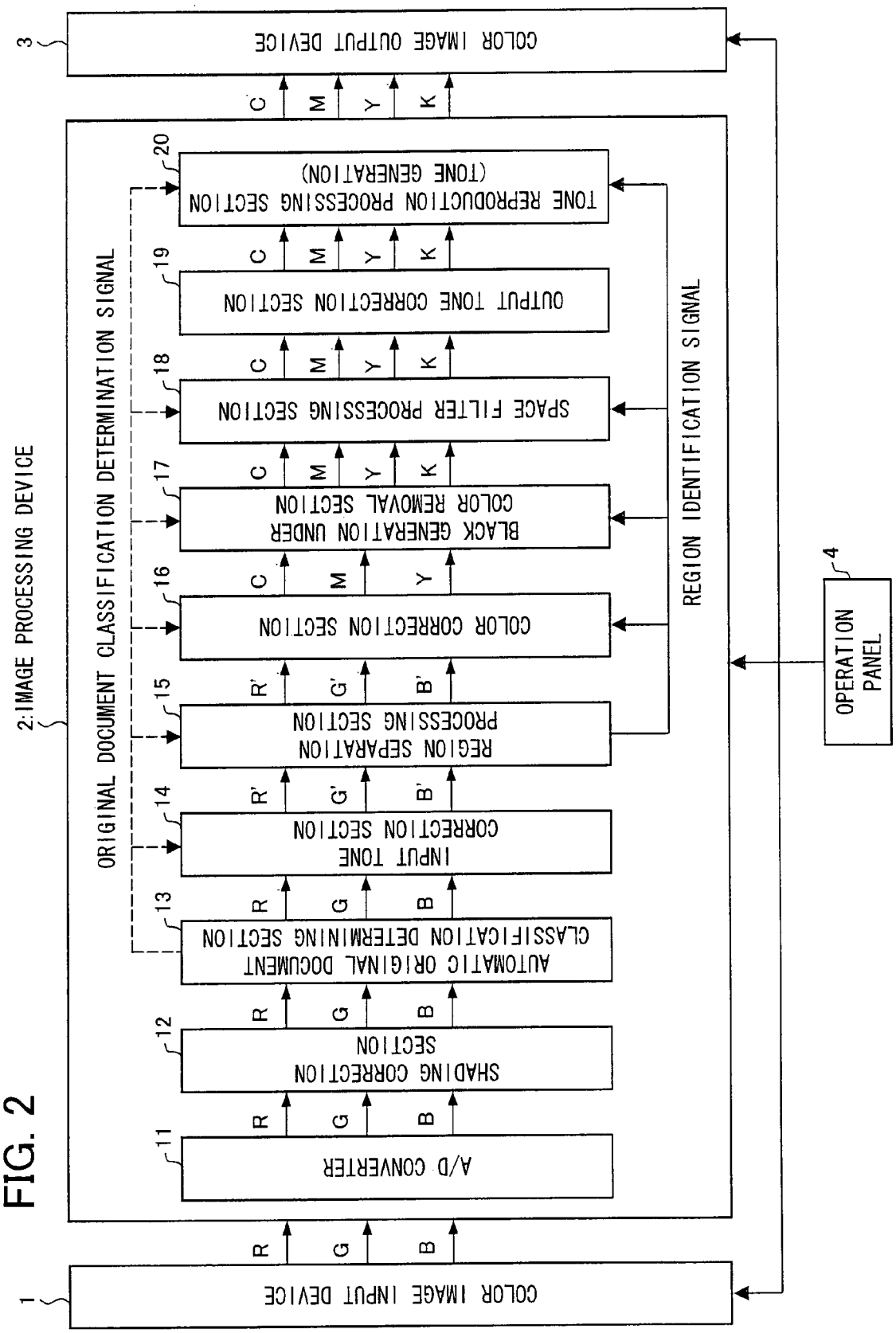
FIG. 2 is a block diagram schematically illustrating an arrangement of an image forming apparatus including the image processing device according to the embodiment of the present invention.

FIG. 2 is a block diagram schematically illustrating an arrangement of a digital color copying machine to which a color image processing device (image processing device) 2 is applied. As illustrated in FIG. 1, the digital color copying machine of the present embodiment includes a color image input device 1, a color image processing device 2, a color image output device 3, and an operation panel 4. The color image processing device 2 includes an A/D converter 11, a shading correction section 12, an automatic original document classification determining section (original document classification determining section) 13, an input tone correction section (page-background color removal section) 14, a region separation processing section 15, a color correction section 16, a black generation under color removal section 17, a space filter processing section 18, an output tone correction section 19, and a tone reproduction processing section 20.

The color image input device (image read section) 1 is, for example, composed of a scanner (not shown) including a CCD (Charge Coupled Device). In the color image input device 1, the CCD reads an optical image reflected from an original document as RGB (R:Red, G:Green, B:Blue) analog signals and supplies the RGB analog signals to the color image processing device 2.

The analog signals read by the color image input device 1 are transmitted to the A/D converter 11, the shading correction section 12, the automatic original document classification determining section 13, the input tone correction section 14, the region separation processing section 15, the color correction section 16, the black generation under color removal section 17, the space filter processing section 18, the output tone correction section 19, and the tone reproduction processing section 20 in this order in the color image processing device 2. Ultimately, the analog signals are outputted to the color image output device 3 as CMYK digital color signals.

The A/D (Analog/Digital) converter 11 converts the RGB analog signals into RGB digital signals. The shading correction section 12 removes various distortions produced in illumination system, image formation system, and image pickup system of the color image input device 1 from the RGB digital signals transmitted from the A/D converter 11. Moreover, the shading correction section 12 adjusts color balance of the RGB digital signals.

The automatic original document classification determining section 13 converts the RGB signals (RGB reflectivity signals), whose various distortions are removed by the shading correction section 12 and whose color balance is adjusted, into signals, such as density signals, which can be handled easily by an image processing system used in the color image processing device 2. The automatic original document classification determining section 13 also determines the classification of an original document. The automatic original document classification determining section 13 generates an original document classification determining signal which is outputted to the input tone correction section 14, the region separation processing section 15, the color correction section 16, the black generation under color removal section 17, the space filter processing section 18, and the tone reproduction processing section 20. The automatic original document classification determining section 13 is explained in details later.

The input tone correction section 14 removes page-background density (page-background color) and adjusts image quality such as contrast. The input tone correction section 14 is provided with a plurality of tables used for page-background color removal processing and is arranged so as to remove the page-background density by choosing a page-background color removal table in accordance with a tone level of the page-background color. The input tone correction section 14 is explained later in details.

The region separation processing section 15 separates each pixel of an input image into either one of a character region, a halftone dot region, or a photograph (photographic paper photograph) region, according to the RGB signals. On the basis of a result of the separation, the region separation processing section 15 outputs a region identification signal, indicating which region a pixel of the input image belongs to, to the color correction section 16, the black generation under color removal section 17, the space filter processing section 18, and the tone reproduction processing section 20. The region separation processing section 15 also outputs the input signal as received from the input tone correction section 14 to the subsequent color correction section 16.

The color correction section 16 removes color impurity on the basis of spectral properties of CMY (C:Cyan, M:Magenta, and Y:Yellow) color materials including an unnecessarily absorbed component, in order to realize a faithful color reproduction. The color correction section 16 includes a plurality of color correction tables respectively corresponding to page-background colors. The color correction tables are adjusted so that color taste of the color that remains after the page-background color removal processing does not change extremely due to influence of the page-background color removal processing. According to the present embodiment, this makes it possible to suppress an extreme change in the color taste after color correction processing and, therefore, to appropriately reproduce colors of an original document, even in a case where image data whose page-background color density is removed in the input tone correction processing is subjected to a color correction processing. The color correction section 16 is explained more in details later.

The black generation under color removal section 17 performs (i) black generation processing for generating a black (K) signal from three color (CMY) signals after the color correction processing and (ii) generation processing of new CMY signals by deducting the K signal obtained by the black generation processing from the original CMY signals. As a result, the three CMY signals are converted into four CMYK signals.

One example of the black generation processing uses a method (a general method) in which the black generation processing is performed by skeleton black. According to this method, the black generation under color removal processing is expressed by the following equation (1):

$K'=f\{\min(C, M, Y)\}$ $C'=C-\alpha K'$ $M'=M-\alpha K'$ $Y'=Y-\alpha K'$ (1)

where an input/output characteristic of a skeleton curve is expressed by y=f(x), C, M, and Y indicate inputted data, C', M', Y', and K' indicate outputted data, and a UCR (Under Color Removal) rate is $\alpha(0<\alpha<1)$.

With the use of a digital filter, the space filter processing section 18 performs a space filter processing on the basis of a region identification signal, with respect to the image data which is received in the form of the CMYK signals from the black generation under color removal section 17. In the space filter processing, the space filter processing section 18 corrects a space frequency characteristic, so as to prevent a blur or granularity deterioration in an output image. The tone reproduction processing section 20, as with the space filter processing section 18, performs predetermined processing with respect to the image data in the form of the CMYK signals, on the basis of the region identification signal.

For example, in the region separated into a character region by the region separation processing section 15, the space filter processing section 18 strongly emphasizes a high frequency component in sharpness emphasizing processing of the space filter processing, in order to improve reproducibility of black characters or color characters especially. Concurrently, the tone reproduction processing section 20 chooses either binary processing or multi-value processing on a high-resolution screen suitable for reproducing the high frequency component.

In the region separated into a halftone dot region by the region separation processing section 15, the space filter processing section 18 performs a low pass filter processing for removing an input halftone dot component. The output tone correction section 19 performs the output tone correction processing in which a signal such as the density signal is converted into a halftone dot area rate that is a characteristic value of a color image output device 3. Subsequently, the tone reproduction processing section 20 performs the tone reproduction processing (tone generation) so that, ultimately, an image can be broken down into pixels and each tone of the pixels can be reproduced. In the region separated into a photograph region by the region separation processing section 15, the binary processing or the multi-value processing is performed on a screen, in which processing the tone reproducibility is emphasized.

The operation panel 4 includes, for example, a display section (not shown) such as a liquid crystal display and setting buttons. In response to information which is entered via the operation panel 4, each operation of the color image input device 1, the color image processing device 2, and the color image output device 3 is controlled.

The image data which has been subjected to each of the processing mentioned above is temporarily stored in storage means. The image data is read from the storage means at a predetermined timing and supplied to the color image output device 3. The color image output device 3 outputs the image data onto a recording medium such as paper. An example of the color image output device 3 is a color image output device which uses an electrophotographic method or an ink-jet method. However, the image output device 3 is not specifically limited to this. All of the processing mentioned above is controlled by a CPU (Central Processing Unit) that is not shown.

(1-2 Automatic Original Document Classification Determining Section 13)

Next explained is an arrangement of the automatic original document classification determining section 13. Although a specific explanation is provided here for one example of arrangements of the automatic original document classification determining section 13, the arrangement of the automatic original document classification determining section 13 is not limited to this. The automatic original document classification determining section 13 may be anything that is capable of determining a classification of a block made of plural pixels including a target pixel and is capable of determining at least whether this block is included in a page-background region.

Figure 3:
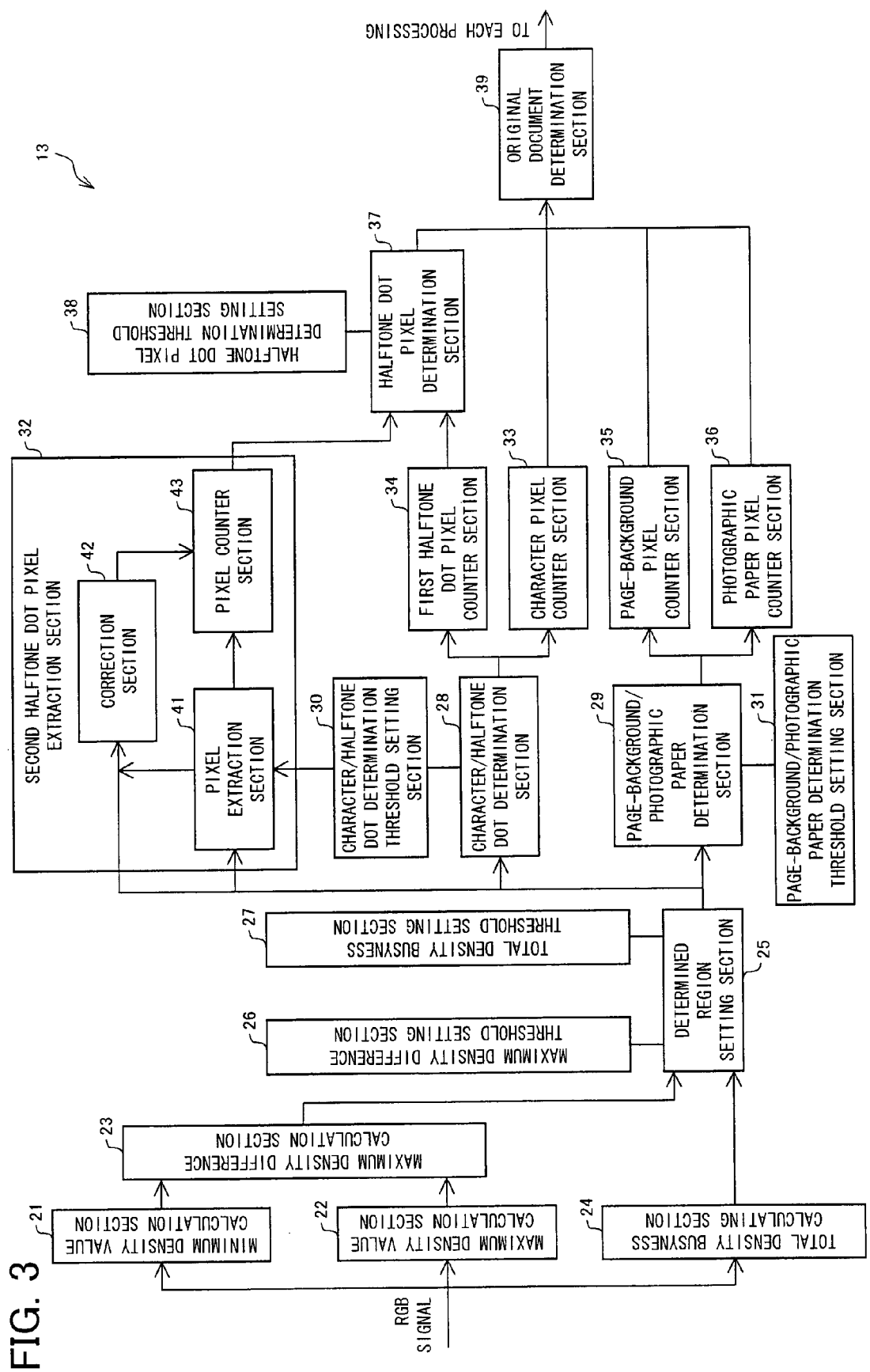
FIG. 3 is a block diagram illustrating a structure of an automatic original document classification determination section included in the image processing device according to the embodiment of the present invention.

FIG. 3 is a block diagram illustrating an arrangement of the automatic original document classification determining section 13 as illustrated in FIG. 2. This automatic original document classification determining section 13, as illustrated in FIG. 3, includes a minimum density value calculation section 21 (feature amount extraction section), a maximum density value calculation section 22 (feature amount extraction section), a maximum density difference calculation section 23 (feature amount extraction section), a total density busyness calculating section 24 (feature amount extraction section), a determined region setting section (first halftone dot pixel detection section, second halftone dot pixel detection section) 25, a maximum density difference threshold setting section (determination standard setting section) 26, a total density busyness threshold setting section (determination standard setting section) 27, a character/halftone dot determination section (first halftone dot pixel detection section) 28, a page-background/photographic paper determination section 29, a character/halftone dot determination threshold setting section (determination standard setting section) 30, a page-background/photographic paper determination threshold setting section 31, a second halftone dot pixel extraction section 32, a character pixel counter section 33, a first halftone dot pixel counter section 34, a page-background pixel counter section 35, a photographic paper pixel counter section 36, a halftone dot pixel determination section (classification determination section) 37, a halftone dot pixel determination threshold setting section (classification determination section) 38, and an original document determination section (classification determination section) 39.

The minimum density value calculation section 21 calculates a minimum density value of a block made of a plurality of pixels including one target pixel. The maximum density value calculation section 22 calculates a maximum density value of the block. The maximum density difference calculation section 23 calculates a maximum density difference of the block by using the minimum density value calculated by the minimum density value calculation section 21 and the maximum density value calculated by the maximum density value calculation section 22. The total density busyness calculating section 24 calculates a total density busyness, which is the sum of absolute values of the density differences between adjacent pixels in the above-mentioned block.

The determined region setting section 25 compares the maximum density difference calculated by the maximum density difference calculation section 23 with a first maximum density difference threshold THd1 given by the maximum density difference threshold setting section 26. Moreover, the determined region setting section 25 compares the total density busyness calculated by the total density busyness calculation section 24 with a first total density busyness threshold THb1 given by the total density busyness threshold setting section 27. On the basis of the comparisons, the determined region setting section 25 determines whether the target pixel in the above-mentioned block belongs to (i) a region including the page-background region/the photographic paper (photograph) region (hereinafter, referred to as a page-background/photographic paper (photograph) region) or (ii) a region including the character region/the halftone dot region (hereinafter, referred to as a character/halftone dot region).

Moreover, the determined region setting section 25 compares the maximum density difference calculated by the maximum density difference calculation section 23 with a second maximum density difference threshold THd2 (THd1>THd2) given by the second maximum density difference threshold setting section 26. The determined region setting section 25 also compares the above-mentioned total density busyness calculated by the total density busyness calculating section 24 with a second total density busyness threshold THb2 (THb2>THb1) given by the total density busyness threshold setting section 27. On the basis of the comparisons, the determined region setting section 25 determines whether or not the above-mentioned block satisfies the conditions (i) that a maximum density difference is equal to or more than the second maximum density difference threshold THd2 and (ii) that a total density busyness is at least the second total density busyness threshold THb2.

Target pixels are sequentially subjected to (i) the determination processing using a first maximum density difference threshold THd1 and a first total density busyness threshold THb1 and (ii) the determination processing using a second maximum density difference threshold THd2 and a second total density busyness threshold THb2. In other words, the automatic original document classification determining section 13 determines which region a target pixel belongs to by using two kinds of thresholds, i.e., a maximum density difference threshold and a total density busyness threshold. Moreover, the determinations are carried out from one target pixel to the next. This causes a shift from one block area including respective corresponding target pixel to the next. The CPU carries out various controls derived from the determination processing.

The maximum density difference threshold setting section 26 sets a first maximum density difference threshold THd1 and a second maximum density difference threshold THd2 (THd1>THd2), on the basis of the maximum density difference calculated by the maximum density difference calculation section 23. The first maximum density difference threshold THd1 is set for determining whether a target pixel belongs to (i) a page-background/photographic paper (photograph) region or (ii) a character/halftone dot region. The second maximum density difference threshold THd2 is set for determining whether the target pixel is a second halftone dot pixel or not. The determined region setting section 25 uses the first maximum density difference threshold THd1 and the second maximum density difference threshold THd2.

The total density busyness threshold setting section 27 sets a first total density busyness threshold THb1 and a second total density busyness threshold THb2 (THb1>THb2), on the basis of a total density busyness calculated by the total density busyness calculating section 24. The first total density busyness threshold THb1 is set for determining whether a target pixel belongs to (i) a page-background/photographic paper (photograph) region or (ii) a character/halftone dot region. The second total density busyness threshold THb2 is set for determining whether a target pixel is a second halftone dot pixel or not. The determined region setting section 25 uses the first total density busyness threshold THb1 and the second total density busyness threshold THb2.

The second maximum density difference threshold THd2 and the second total density busyness threshold THb2 are set, while consulting, for example, a threshold for detecting a pixel that belongs to a photographic paper (photograph) region, so that it becomes possible to extensively extract pixels which belong to a halftone dot pixel area. The pixels to be extracted include pixels that are judged to have a feature which a halftone dot pixel area would have, i.e., such pixels include not only (i) a halftone dot (first halftone dot pixel) used in halftone dot printing but also (ii) a pixel (second halftone dot pixel) whose tone is reproduced by the error diffusion method, the dither processing, the line screen, or the like.

The character/halftone dot determination section 28 determines whether a pixel which have been determined to belong to a character/halftone dot region by the determined region setting section 25 belongs to a character region or a halftone dot region. The character/halftone dot determination threshold setting section 30 sets a character/halftone dot determination threshold by which the character/halftone dot determination section 28 carries out the determination.

The page-background/photographic paper determination section 29 determines whether a pixel which have been determined to belong to a page-background/halftone dot region by the determined region setting section 25 belongs to a page-background region or a photographic paper region (photographic paper photograph region, continuous tone region). The page-background/photographic paper determination threshold setting section 31 sets a page-background/photographic paper determination threshold by which the page-background/photographic paper determination section 29 carries out the determination.

The second halftone dot pixel extraction section 32 includes a pixel extraction section (second halftone dot pixel detection section) 41, a correction section 42, and a pixel counter section 43.

The pixel extraction section 41 compares a value obtained by multiplying the maximum density difference by the character/halftone dot determination threshold with the total density busyness, with respect to a target pixel in a block which is determined by the determined region setting section 25 to have (i) a maximum density difference equal to or more than the second maximum density threshold difference threshold THd2 and (ii) a total density busyness equal to or more than the second total density busyness threshold THb2. Then, the pixel extraction section 41 extracts the target pixel in the block which satisfies the condition that the total density busyness is equal to or more than the value obtained by multiplying the maximum density difference by the character/halftone dot determination threshold.

The correction section 42 corrects a pixel assumable to be the second halftone dot pixel among pixels (subject pixels) including (i) a pixel which has been determined by the determined region setting section 25 to belong to neither the character region nor the halftone dot region in the determination processing using the second maximum density difference threshold THd2 and the second total density busyness threshold THb2 or (ii) a pixel that has not been extracted by the pixel extraction section 41 as the second halftone dot pixel. As a result of the correction, the pixel is treated as the second halftone dot pixel. Possibility of this correction is determined with reference to a determination result of a pixel neighboring the subject pixel taken as the target pixel.

The pixel counter section 43 counts number of pixels that have been determined to be the second halftone dot pixels (including number of the pixels assumed to be the second halftone dot pixels) by the pixel extraction section 41 and the correction section 42.

The character pixel counter section 33 counts number of pixels that have been determined to belong to the character region by the character/halftone dot determination section 28. The first halftone dot pixel counter section 34 counts the number of pixels that have been determined by the character/halftone dot determination section 28 to belong to the halftone dot region (first halftone dot pixel). The page-background pixel counter section 35 counts number of pixels that have been determined by the page-background/photographic paper determination section 29 to belong to the page-background region. The photographic paper pixel counter section 36 counts number of pixels that have been determined by the page-background/photographic paper determination section 29 to belong to the photographic paper photograph region.

Note that the number of the pixels counted here is a total number of pixels in a whole image on an original document.

The halftone dot pixel determination section 37 (a) compares (i) a total number of pixels (first halftone dot pixel) that belong to the halftone dot region, as a result of the count by the first halftone dot pixel count section 34, and a total number of pixels that belong to the second are tone pixels, as a result of the count by the pixel counter section 43 of the second halftone dot pixel extraction section 32, with (ii) the halftone dot pixel determination threshold provided by the halftone dot pixel determination threshold setting section 38, and (b) determines whether or not a halftone dot (first halftone dot pixel) is included in the original document image. The halftone dot pixel determination threshold setting section 38 sets a halftone dot pixel determination threshold used by the halftone dot pixel determination section 37.

The original document determination section 39 determines a classification of the original document according to the number of the pixels respectively counted by the character pixel counter section 33, the page-background pixel counter section 35, the photographic paper pixel counter section 36, and the result of determination made by the halftone dot pixel determination section 37.

Here, an example of distribution of pixel density in each of the character region, the halftone dot region, the photographic paper photograph region, and the page-background region is explained with reference to FIGS. 4(a) through 4(d). With reference to FIG. 5, distribution of the each region is explained, the distribution having the maximum density difference and the total density busyness as indicators. In a relationship between the maximum density difference and the total density busyness, the total density busyness never becomes equal to or less than the maximum density difference. In FIG. 5, the region where the maximum density difference is equal to or less than the total density busyness indicates a region where a pixel does not exist.

Figure 4:
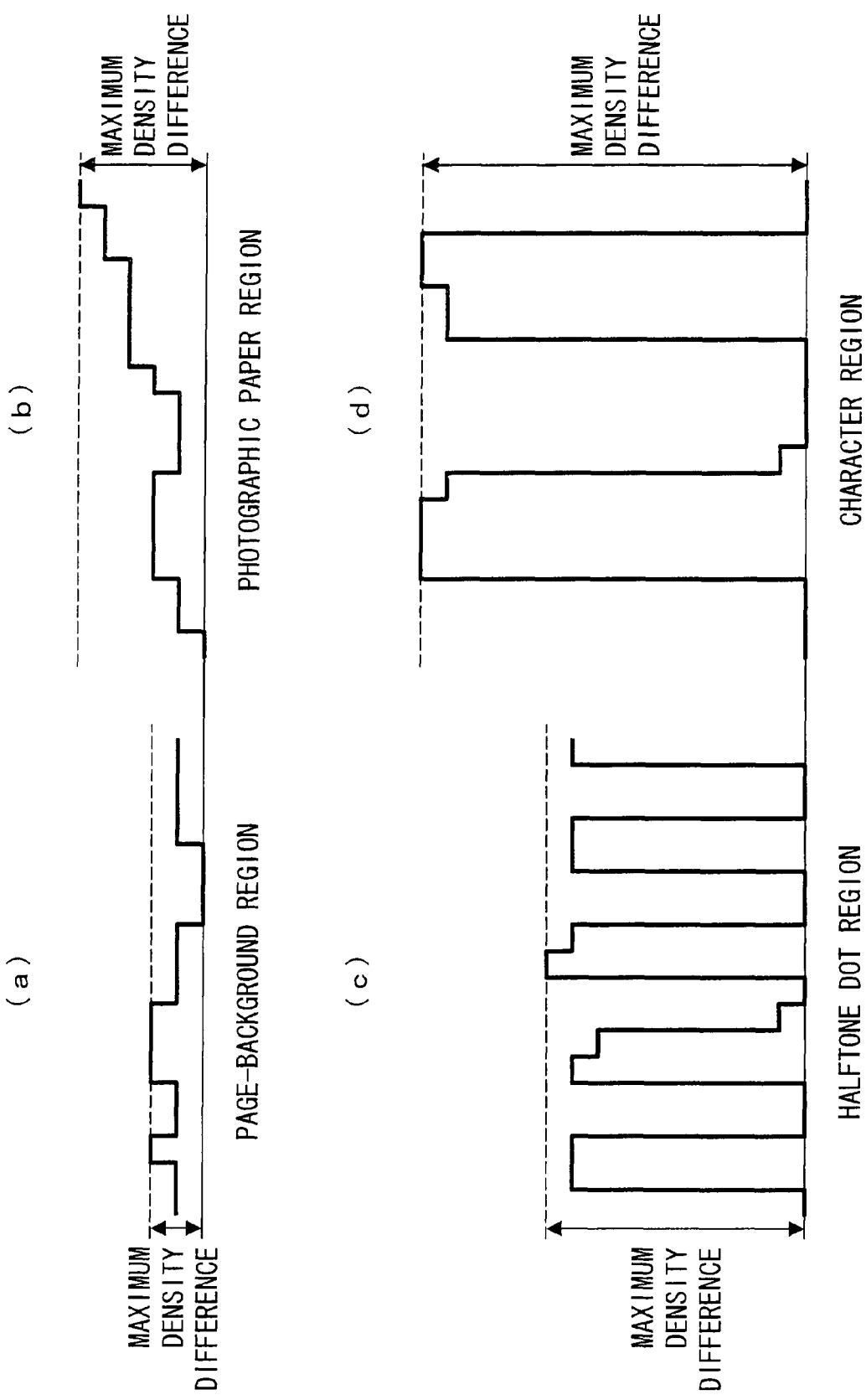
FIG. 4(a) is an explanatory diagram illustrating maximum density difference of a page-background region and density distribution in the page-background region.
FIG. 4(b) is an explanatory diagram illustrating maximum density difference of a photographic paper region and density distribution of the photographic paper region.
FIG. 4(c) is an explanatory diagram illustrating maximum density difference of a halftone dot region and density distribution of the halftone dot region.
FIG. 4(d) is an explanatory diagram illustrating maximum density difference of a character region and density distribution of the character region.
Figure 5:
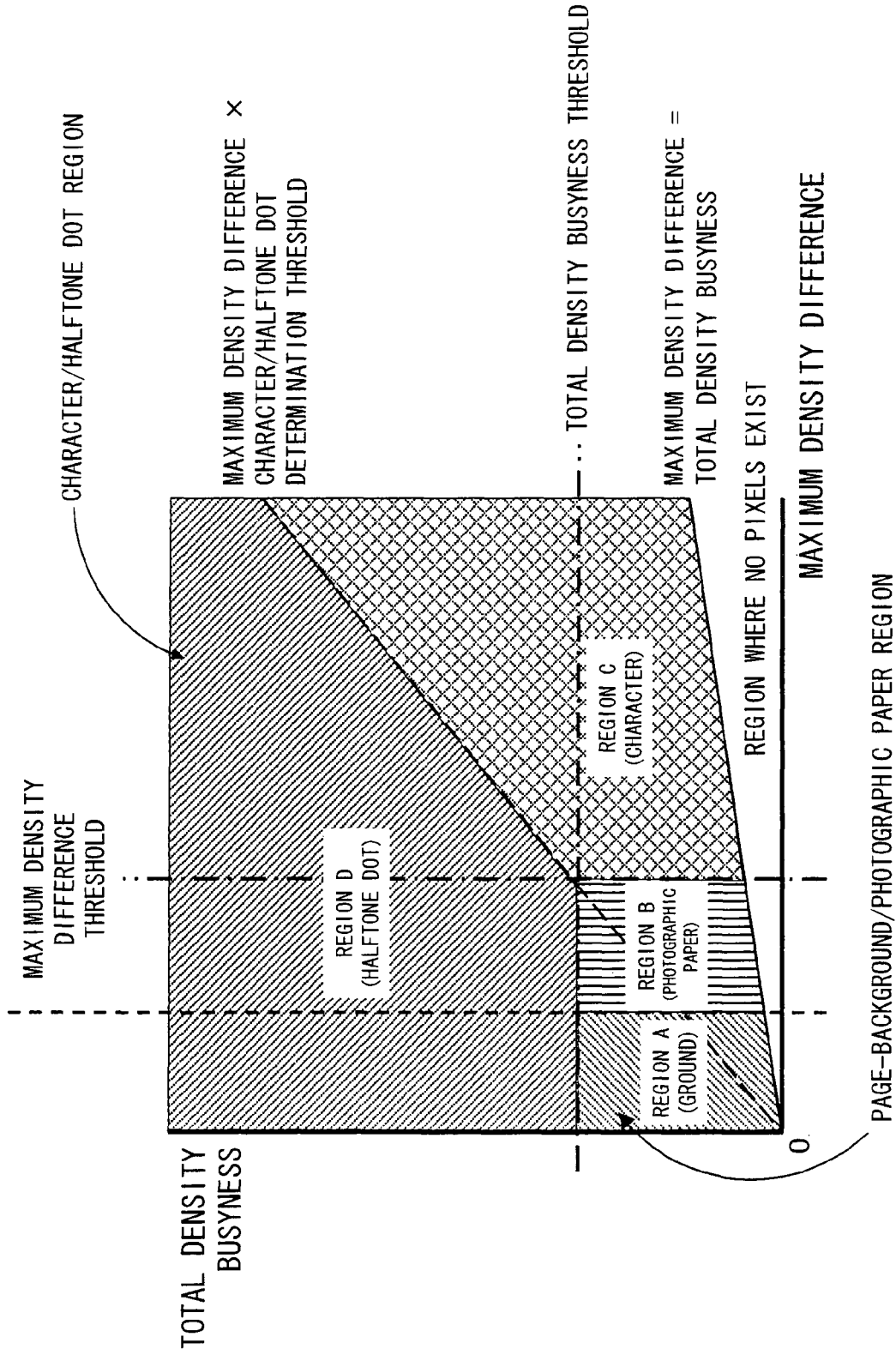
FIG. 5 is a graph illustrating a relationship of the maximum density difference of each of the regions illustrated in FIGS. 4(a) through 4(d) and a total density busyness.
Figure 8:
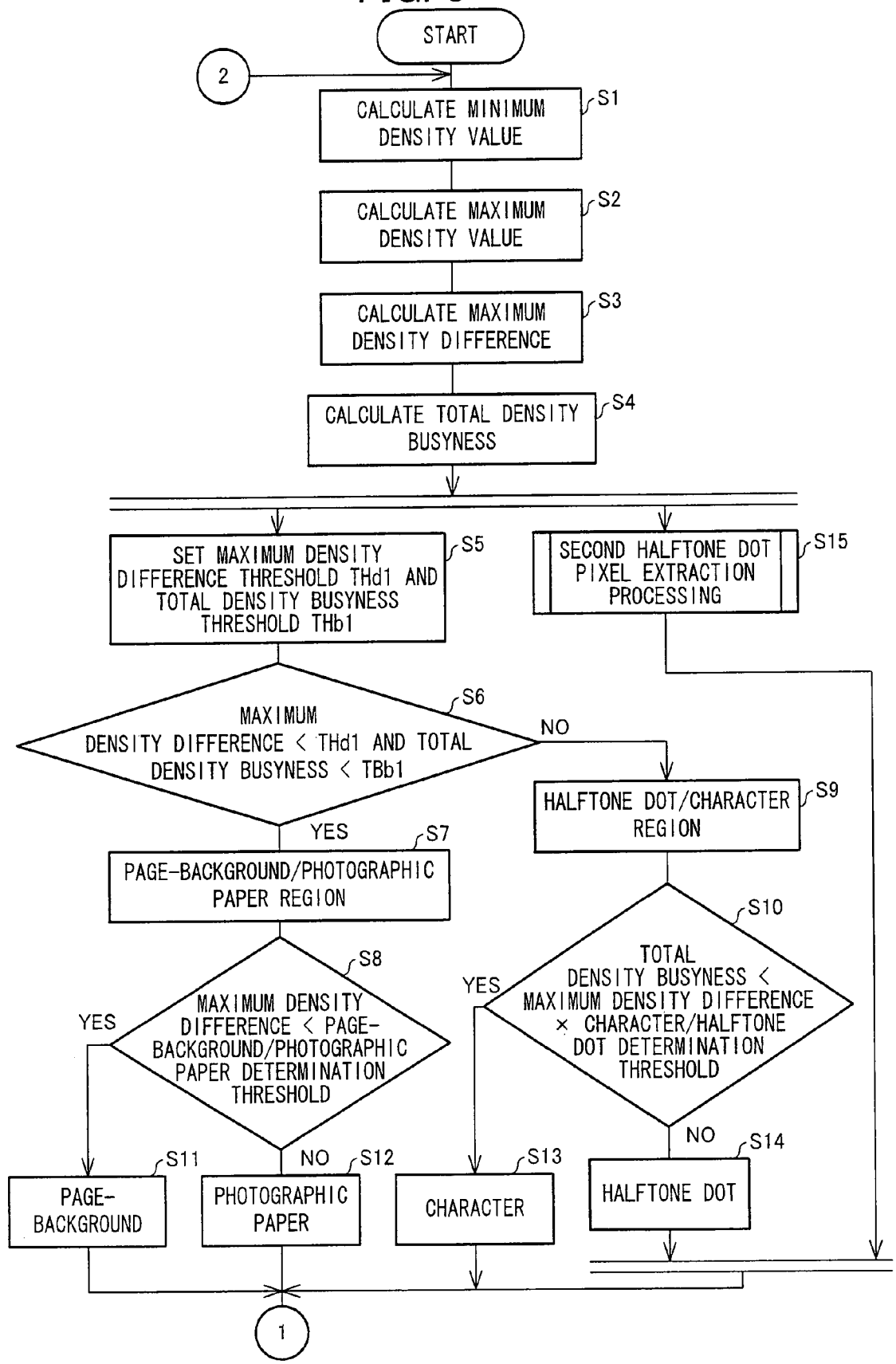
FIG. 8 is a flow chart illustrating a flow of original document classification determination processing performed by the automatic original document classification determination section illustrated in FIG. 3.
Figure 9:
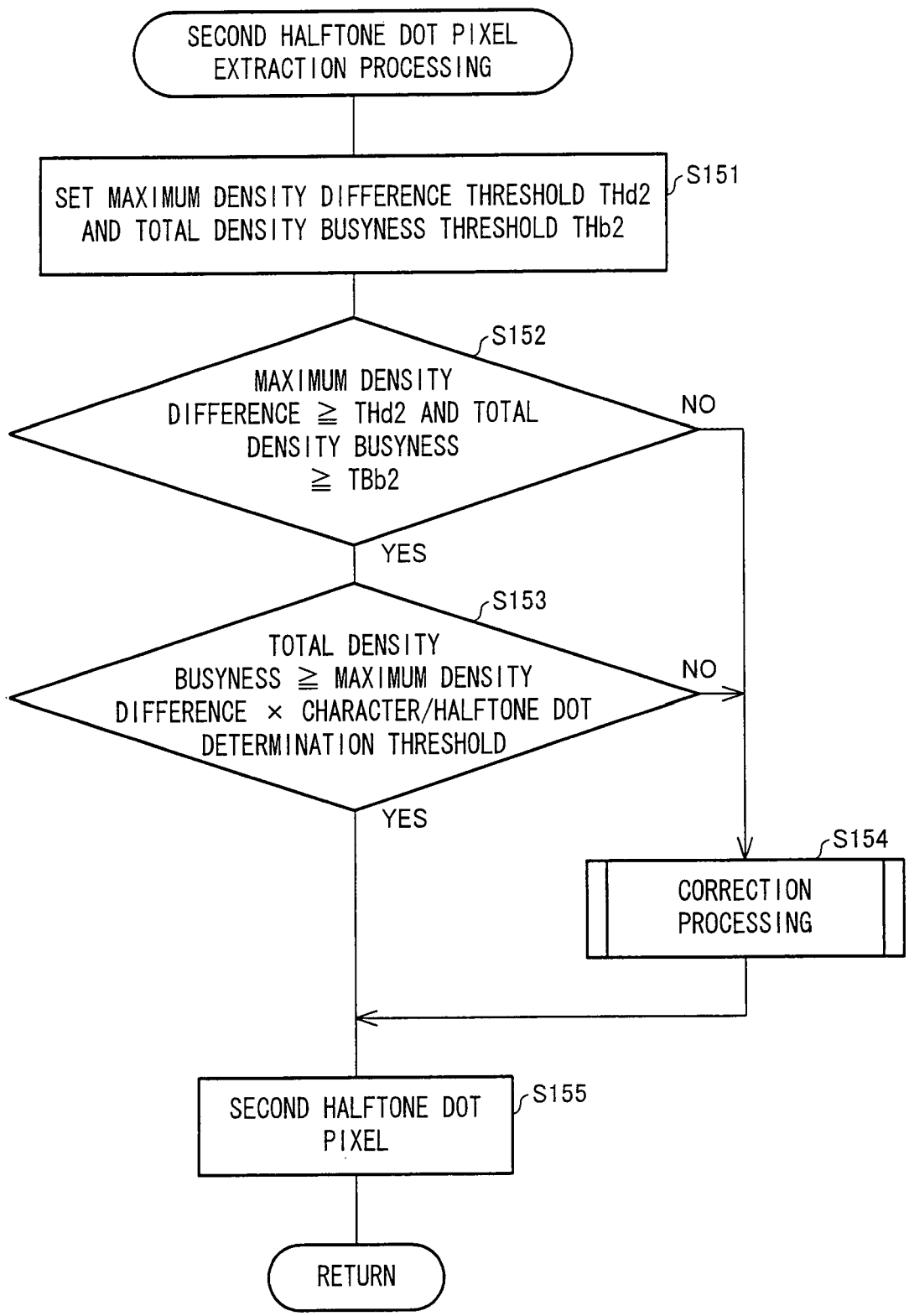
FIG. 9 is a flow chart illustrating a flow of second halftone dot pixel extraction processing performed by the second halftone dot pixel extraction section in S15 of FIG. 8.
Figure 10:
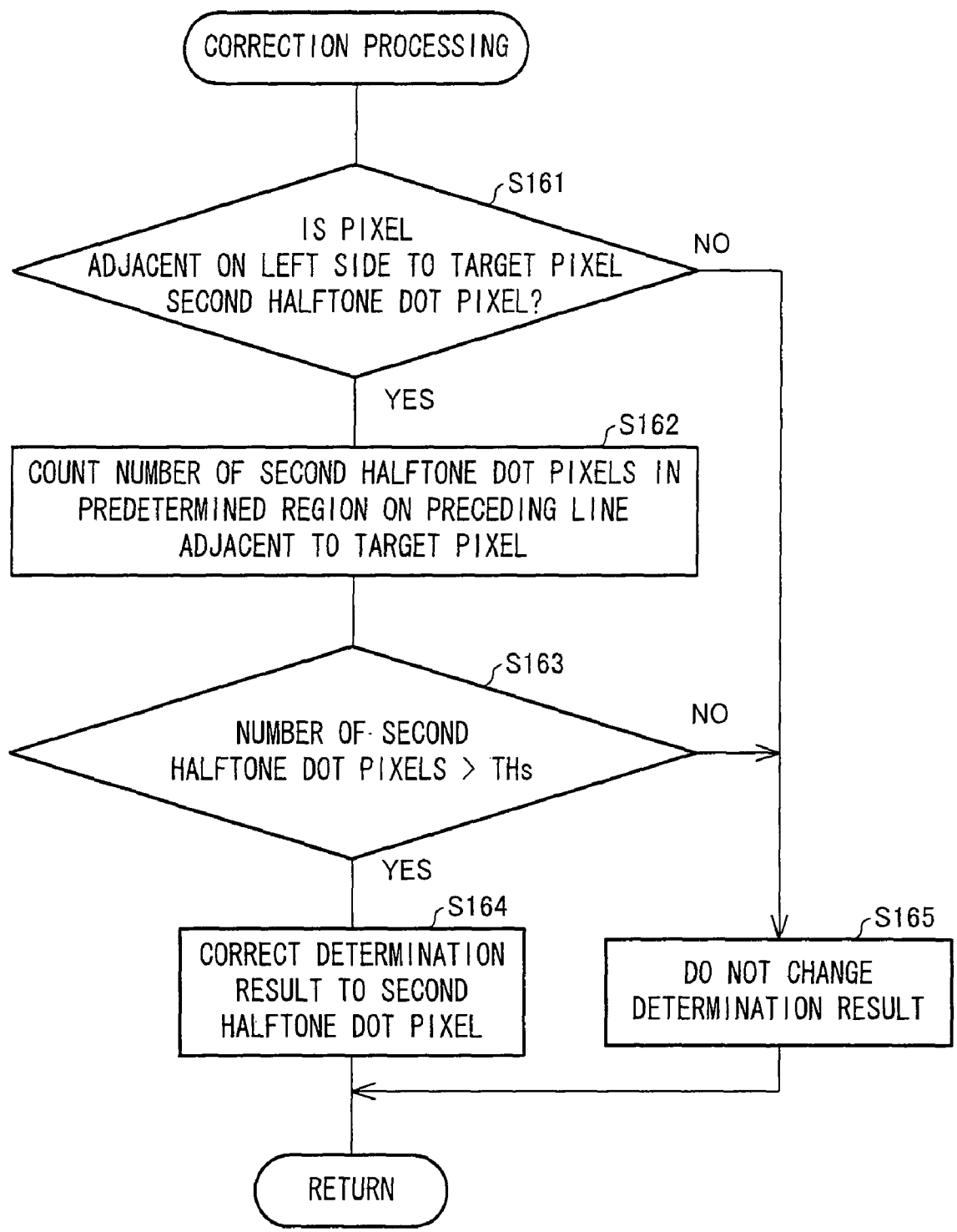
FIG. 10 is a flow chart illustrating a flow of correction processing performed by the correction section in S154 of FIG. 9.

As illustrated in FIG. 4(a), the page-background region generally has a small change in density. Accordingly, both of the maximum density difference and the total density busyness become very small. Consequently, the page-background region is distributed in a region A as illustrated in FIG. 5. Therefore, it is possible to determine as a page-background pixel the pixel which has been determined to belong to the page-background/photographic paper region and has the maximum density difference smaller than the page-background/photographic paper determination threshold.

As illustrated in FIG. 4(b), the photographic paper photograph region generally has a smooth change in density. Accordingly, both the maximum density difference and the total density busyness are small, but a little larger than those of the page-background region. Consequently, the photographic paper photograph region is distributed in a region B as illustrated in FIG. 5. Therefore, it is possible to determine the pixel (target pixel) which has been determined to belong to the page-background/photographic paper region and is in a block that has the maximum density larger than the page-background/photographic paper determination threshold, as a pixel belonging to the photographic paper region.

As illustrated in FIG. 4(c), values of maximum density differences in the halftone dot region vary depending upon a position in the halftone dot region. However, because the number of changes in density equals to the number of halftone dots, a ratio of the total density busyness with respect to the maximum density difference becomes large. Consequently, the halftone dot region is distributed in a region D as illustrated in FIG. 5. Therefore, it is possible to determine the pixel (target pixel) which has been determined to belong to the character/halftone dot region and is in a block that has the total density busyness larger than a product obtained by multiplying the maximum density difference by the character/halftone dot determination threshold, as a pixel belonging to the halftone dot region.

As illustrated in FIG. 4(d), in the character region, the maximum density difference is large. Along with the large maximum density difference, the total density busyness becomes large. However, because the density does not change as much as that in the halftone dot region, the total density busyness becomes smaller than that of the halftone dot region and, especially, a ratio of the total density busyness with respect to the maximum density difference becomes smaller than that in the halftone dot region. Consequently, the character region is distributed in a region C as illustrated in FIG. 5. Therefore, it is possible to determine the pixel (target pixel) which has been determined to belong to the character/halftone dot region and is in a block that has the total density busyness smaller than the product obtained by multiplying the maximum density difference by the character/halftone dot determination threshold, as a pixel belonging to the character region.

As explained above, the page-background region and the photographic paper photograph region have smaller maximum density difference and total density busyness than those of the character region and the halftone dot region. Accordingly, the determined region setting section 25 can determine whether the target pixel belongs to the page-background/photographic paper region or the character/halftone dot region by (i) a comparison between the maximum density difference and the maximum density difference threshold (first maximum density difference threshold THd1) and (ii) a comparison between the total density busyness and the total density busyness threshold (first total density busyness threshold THb1).

Next explained are the first halftone dot pixel and the second halftone dot pixel. FIG. 6(a) is an explanatory diagram of density values of pixels close to one halftone dot in a region including a first halftone dot pixel (halftone dot). FIG. 6(b) is an explanatory diagram of a change in density in the region including the first halftone dot pixel. FIG. 7(a) is an explanatory diagram of density values of pixels close to one halftone dot in a region including a second halftone dot pixel (halftone dot). FIG. 7(b) is an explanatory diagram of a change in density in the region including the second halftone dot pixel. In FIGS. 6(a) and 7(a), density values of the halftone dots are expressed by six values from 0 to 5, where "0" indicates a minimum density (white: background color) and "5" indicates a maximum density.

Halftone dot printing uses halftone dots (first halftone dot pixels) having definite differences in color deepness and uses an appropriate halftone frequency for printed material. Accordingly, the halftone dot printing original document has halftone dots of high density and substantially regular intervals between the halftone dots. (Refer to FIGS. 6(a) and 6(b))

With reference to flow charts illustrated in FIGS. 8 through 11, an operation of the original document classification determination processing carried out by the automatic original document classification determining section 13 is explained. In the explanation below, a block which is made of plural pixels including one target pixel is assumed to include n×m pixels (for example, 15×15).

First, the minimum density value calculation section 21 calculates a minimum density value of an n×m-pixel block including the target pixel (S1), and the maximum density value calculation section 22 calculates a maximum density value of the block (S2). Next, the maximum density difference calculation section 23 calculates a maximum density difference of the block by using the minimum density value thus calculated and the minimum density value thus calculated (S3). The total density busyness calculating section 24 calculates a summation of absolute values of density differences of adjacent pixels, in other words, a total density busyness (S4). The maximum density difference calculation processing and the total density busyness calculation processing may be carried out by turns or concurrently.

Next, the determined region setting section 25 (a) compares (i) the maximum density difference calculated by the maximum density difference calculation section 23 with (ii) the first maximum density difference threshold THd1 and the second maximum density difference threshold Thd2. The determined region setting section 25 also (b) compares (i) the total density busyness calculated by the total density busyness calculating section 24 with (ii) the first total density busyness threshold THb1 and the second total density busyness threshold THd2 ((a) S5 and S6, (b) S151 and S152 (Refer to FIG. 9)).

In a case where the maximum density difference is smaller than the first maximum density difference threshold THd1 and the total density busyness is smaller than the first total density busyness threshold THb1 (S6), the determined region setting section 25 determines that the target pixel of the block belongs to the page-background/photographic paper region (S7). On the other hand, in a case where the above-mentioned condition is not satisfied at S6, the determined region setting section 25 determines that the target pixel belongs to the character/halftone dot region (S9).

In a case where the target pixel has been determined to belong to the page-background/photographic paper region, the page-background/photographic paper determination section 29 compares the maximum density difference of the block including the target pixel with the page-background/ photographic paper determination threshold (S8). In a case where the maximum density difference is smaller as a result of the comparison, the page-background/photographic paper determination section 29 determines that the target pixel belongs to the page-background region (S11). On the other hand, in a case where the maximum density difference is larger as a result of the comparison, the page-background/ photographic paper determination section 29 determines that the target pixel belongs to the photographic paper region (S12).

In the case where the target pixel has been determined to belong to the character/halftone dot region at S9, the character/halftone dot determination section 28 compares a value of a product obtained by multiplying the maximum density difference of the block including the target pixel by the character/halftone dot determination threshold with the total density busyness (S10). In a case where the total density busyness is smaller as a result of the comparison, the character/halftone dot determination section 28 determines the target pixel belongs to the character region (S13). On the other hand, in a case where the total density busyness is larger as a result of the comparison, the character/halftone dot determination section 28 determines the target pixel belongs to the halftone dot region (S14).

Figure 11:
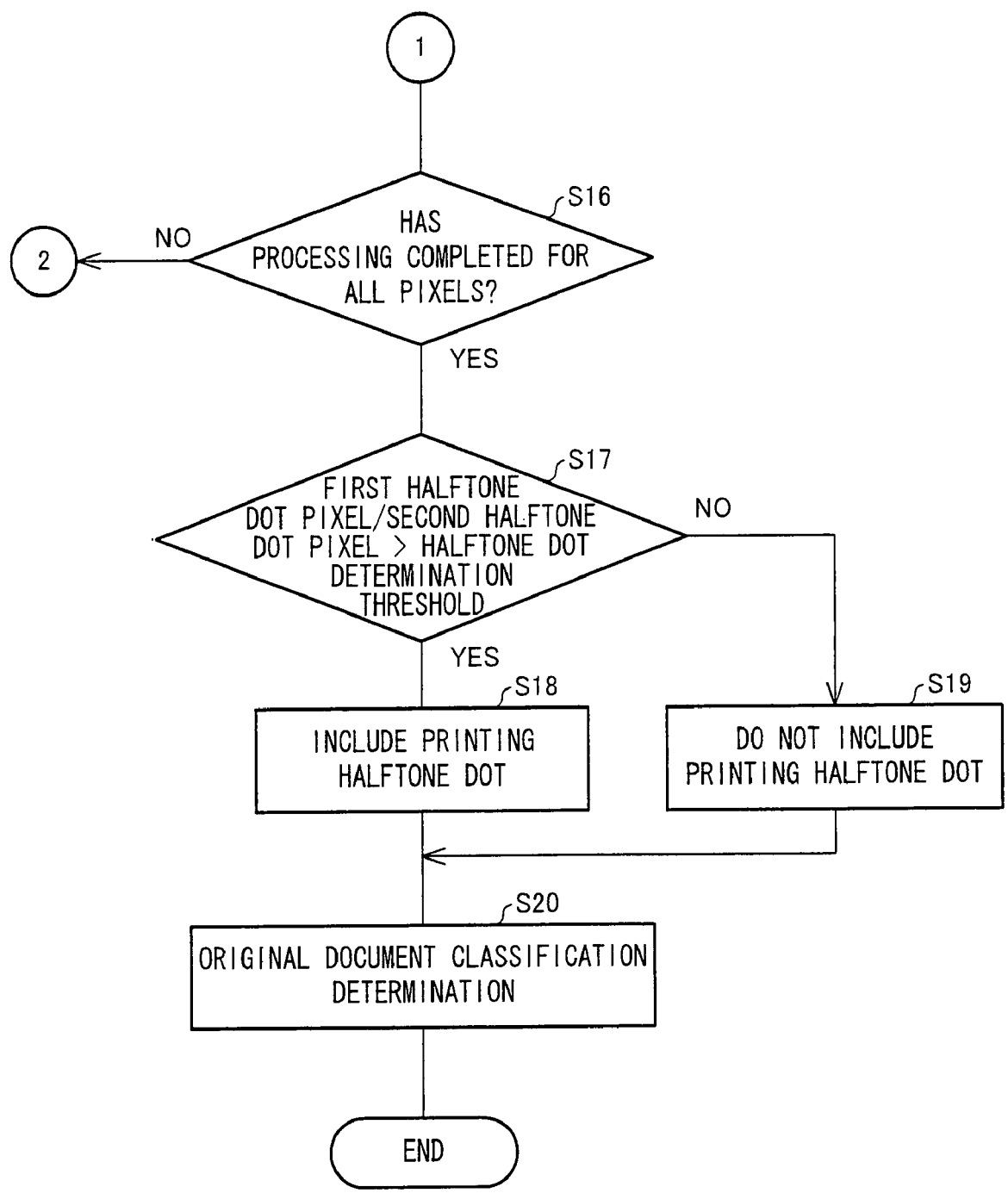
FIG. 11 is a flow chart illustrating a subsequent flow of original document classification determination processing performed by the automatic manuscript classification determination section in FIG. 8.

Next, the automatic original document classification determining section 13 determines whether or not the above-mentioned determination processing has been completed for all of the pixels on the original document image (S16: FIG. 11). In a case where the determination processing has not been completed, the processing returns to Si and repeats the processing thereafter. On the other hand, in a case where the determination processing has been completed, the original document determination section 39 determines original document classification (S20) after processing at S17 through S19.

The second halftone dot pixel extraction section 32, in parallel with the processing at S5 through S14, performs the second halftone dot pixel extraction processing (S15) in the automatic original document classification determining section 13. This processing is illustrated in the flow chart in FIG. 9 in details.

The determined region setting section 25 (a) compares (i) the maximum density difference calculated by the maximum density difference calculation section 23 with (ii) the second maximum density difference threshold THd2 and also (b) compares (i) the total density busyness calculated by the total density busyness calculating section 24 with (ii) the second total density busyness THb2 (S151 and S152).

The pixel extraction section 41 of the second tone pixel extraction section 32 compares (i) a product obtained by multiplying the maximum density difference by the character/halftone dot determination threshold with (ii) the total density busyness, with respect to a block which has been determined that the maximum density difference is equal to or more than the second maximum density difference threshold THd2 and the total density busyness is equal to or more than the second total density busyness threshold THb2 (S153). As a result of this comparison, in a case where the total density busyness is larger, the target pixel in the block is determined to belong to the second halftone dot pixel area (S155).

On the other hand, the correction section 42 accordingly performs correction processing (S154) with respect to candidate pixels for the correction processing, the candidate pixels including (a) a target pixel in a block that has been determined at S152 to have the maximum density difference smaller than the second maximum density difference threshold THd2 or the total density busyness smaller than the second total density busyness threshold THb2 and (b) a target pixel in a block that has been determined at S153 to have the total density busyness in a block determined to have the total density busyness smaller than the product obtained by multiplying the maximum density difference by the character/halftone dot determination threshold. This correction processing is explained below with reference to a flow chart illustrated in FIG. 10 and FIG. 12.

Figure 12:
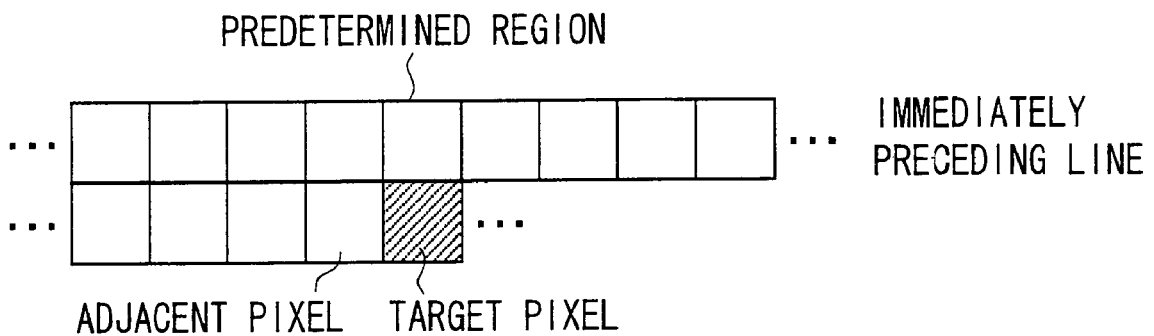
FIG. 12 is an explanatory diagram of correction processing performed by the correction section illustrated in FIG. 3.

First, it is determined whether or not a pixel adjacent on a left side to the target pixel, as illustrated in FIG. 12, has been determined to be a second halftone dot pixel (S161). In FIG. 12, it is assumed that the pixels are processed from left to right and the pixel provided on the left side of the target pixel has been already processed. In a case where the pixels are processed from right to left, the pixels are processed is reverse order from the above-mentioned case. Moreover, it is assumed that the pixels are processed from an upper line to a lower line.

Next, the correction section 42 counts number of pixels that have been determined to be the second halftone dot pixels which are adjacent to the target pixel and provided in a predetermined region on a line immediately preceding a line including the target pixel (S162). Then, the correction section 42 compares the count value with a predetermined threshold THs (S163). In a case where the number of the second halftone dot pixels is equal to or more than the threshold THs as a result of this comparison, the correction section 42 changes the determination result of the target pixel to the second halftone dot pixel (S164). On the other hand, in a case where the number of the second halftone dot pixels is less than the threshold THs, the correction section does not change the determination result of the target pixel (S165).

The predetermined region on the immediately preceding line is selected so as to include the pixel adjacent to the target pixel and set so as to include, for example, 10 pixels. This predetermined region shifts in the same direction as a shift direction of the target pixel along with a sequential shift of the target pixel. In a case where the predetermined region includes ten pixels, the threshold THs is set to, for example, 3.

As mentioned above, the second halftone dot pixel extraction section 32 (a) compares the maximum density difference with the second maximum density difference threshold THd2, (b) compares the total density busyness with the second total density busyness threshold THb2, and (c) compares the total density busyness with a product obtained by multiplying the maximum density difference by the character/halftone dot determination threshold. Subsequently, the second halftone dot pixel extraction section 32 extracts, as the second halftone dot pixel, a pixel which includes a feature amount corresponding to those of the halftone dot pixel. Furthermore, the second halftone dot pixel extraction section 32 adds to a count of the second halftone dot pixels a pixel that can be assumed to be the second halftone dot pixel on the basis of predetermined region information (determination result of the pixel neighboring the target pixel) among the pixels which have been determined not to include the amount that features the halftone dot pixel.

The second halftone dot pixel extraction section 32 uses the product obtained by multiplying the maximum density difference by the character/halftone dot determination threshold at S10 in order to perform the determination processing at S153. However, the value is not limited to this, but a different value may be used. For example, the value may be a smaller than the value used at S10. Specifically, in a case where a value of 6 is used at S10, the value may be set to 4 at S153.

Next, with reference to a flow chart illustrated in FIG. 11, a determination operation of the halftone dot pixel determination section 37 is explained.

In a case where a relation indicated by Cs1/Cs2>THs is satisfied where Cs1 is the value of the first halftone dot pixel counted by the first halftone dot pixel counter section 34, Cs2 is the value of the second halftone dot pixels counted by the pixel counter section 43, and THs is the halftone dot pixel determination threshold set by the halftone dot pixel determination threshold setting section 38, the halftone dot pixel determination section 37 determines that a printing halftone dot is included in the original document image (S17, S18) and assumes that a count value of the first halftone dot pixels is a count value of halftone dots. On the other hand, in a case where the relation above is not satisfied, the halftone dot pixel determination section 37 determines that a printing halftone dot is not included in the original document image (S17, S19). In this determination processing, the halftone dot pixel determination threshold THs is set to, for example, 0.15. Then, the halftone dot pixel determination threshold THs may be set to an appropriate value on the basis of an image sample of various kinds.

Next, an original document classification determination operation of the original document determination section 39 is explained in details. The original document determination section 39 carries out original document classification determination processing, in a case where the halftone dot pixel determination section 37 has determined that an original document image includes a printing halftone dot as mentioned above (S18 in FIG. 11). In the original document classification determination processing, the original document determination section 39 determines a classification of a whole original document by, for example, (i) identifying pixels using image data obtained by pre-scanning the original document, (ii) counting the number of pixels identified to use the counted number of pixels for comparison of a page-background region, a photographic paper region, a halftone dot region, and a character region with respective percentages of the aforesaid regions with respect to a number of all pixels.

Specifically, for example, in a case where a ratio of the character region and a ratio of the halftone dot region are equal to or more than the respective thresholds, the original document determination section 39 determines that the original document is a character/halftone dot printing document (character printing photograph document). Assume that accuracy for the detection becomes higher in an order of character, halftone dot, and photographic paper photograph. In this case, the original document determination section 39 determines that the original document is (i) a character document in a case where the original document has 30% as a ratio of the pixels in the character region with respect to the number of all pixels; (ii) a halftone dot printing document (printing photograph document) in a case where the original document has 20% as a ratio of the pixels in the halftone dot region with respect to the number of all pixels; and (iii) a photographic paper photograph document in a case where the original document has 10% as a ratio of the pixels in the photographic paper region with respect to the number of all pixels.

In the explanation above, the halftone dot pixel determination section 37 determines whether or not a printing halftone dot is included in an original document image, by using a ratio of a count value of the first halftone dot pixels to a count value of the second halftone dot pixels. However, instead of the above-mentioned ratio, it is possible to use a result of computing processing with respect to the count value of the first halftone dot pixels and the count value of the second halftone dot pixels, for example, a sum or a difference thereof.

Furthermore, in a case mentioned above, the correction processing is carried out at S154. However, this correction processing is not compulsory. In a case where the correction processing is not performed, the above-mentioned halftone dot determination processing may be carried out as follows: (i) as mentioned above, the second halftone dot pixel is determined on the basis of respective results of (a) comparison of a maximum density difference with a second maximum density difference threshold, (b) comparison of a total density busyness with a second total density busyness threshold, and (c) comparison of a total density busyness with a product obtained by multiplying a maximum density difference by a character/halftone dot determination threshold; (ii) thus determined second halftone dot pixel is assumed to be a halftone dot pixel; (iii) a halftone dot pixel determination threshold is set to a high value, for example, 0.30 by the halftone dot pixel determination threshold setting section 38; and (iv) the value of the second halftone dot pixels counted by the pixel counter section 43 is compared with the halftone dot pixel determination threshold.

Moreover, in the method explained above, the automatic original document classification determining section 13 performs processing by using the maximum density difference and the total density busyness as features. However, the features are not limited to this. The features may be run-length or times of inversions. Furthermore, an example explained above was a case where the target pixel is first identified to either one of the page-background/photographic paper (photograph) region or the character/halftone dot region, and then further identified to either one of the page-background region or the photographic paper region. However, the determination processing method may be such that it is determined concurrently whether the target pixel is included in the character region, the halftone dot region, the photographic paper region, or the page-background region. In addition, the character region and the halftone dot region may be grouped as one region. In other words, at least processing necessary to be included is processing to determine whether or not the target pixel is included in the page-background region.

Next, an explanation is provided on an example of processing on the basis of a result determined by the automatic original document classification determination processing section 13 in processing sections subsequent to the original document classification determination processing section 13, in a case where the original document classification has been determined.

In a case where it has been determined that plural regions are not present, the subsequent processing is the same as the above mentioned region separation processing. On the other hand, in a case where it has been determined that plural regions are present, intermediate parameters for processing respective regions should be used whereas the parameters for processing regions which are not determined in the original document classification determination processing should not be used.

For example, in a case where the input image (original document) has been determined to be a character document, the input tone correction processing uses a correction curve so as to remove more highlight or emphasize contrast more strongly.

Moreover, on one hand, chroma is put importance on with respect to color characters in color correction processing. On the other, a generous amount of black generation is set in the black generation under color removal processing with respect to black characters. Moreover, with respect to characters, a filter coefficient is arranged to be set so that, for example, an edge is emphasized in the space filter processing and the smoothing processing is eased. In this way, parameters are switched or the like.

In a case where it has been determined that the input image is a character photographic paper photograph document, each processing is performed according to intermediate parameters of those of the character original document processing and the photographic paper photograph original document processing. Depending on emphasis on either one of the character original document or the photographic paper photograph original document, the input tone correction processing is performed according to the intermediate parameter of those of the photographic paper photograph original document processing and the character original document processing so as to remove the highlight or control the contrast. Moreover, by using the intermediate parameter, color correction processing is carried out so that strength of chroma does not become excessive and a balance of tone does not go out of balance. In the black generation under color removal processing, the amount of black generation should be adjusted to such a degree that the photographic paper photograph image is not influenced due to the adjustment.

Next, arrangements of the input tone correction section 14 and color correction section 16 and the color correction processing with respect to the page-background region are explained. First, the arrangement of the input tone correction section 14 is explained.

(1-3. Input Tone Correction Section 14)

Figure 13:
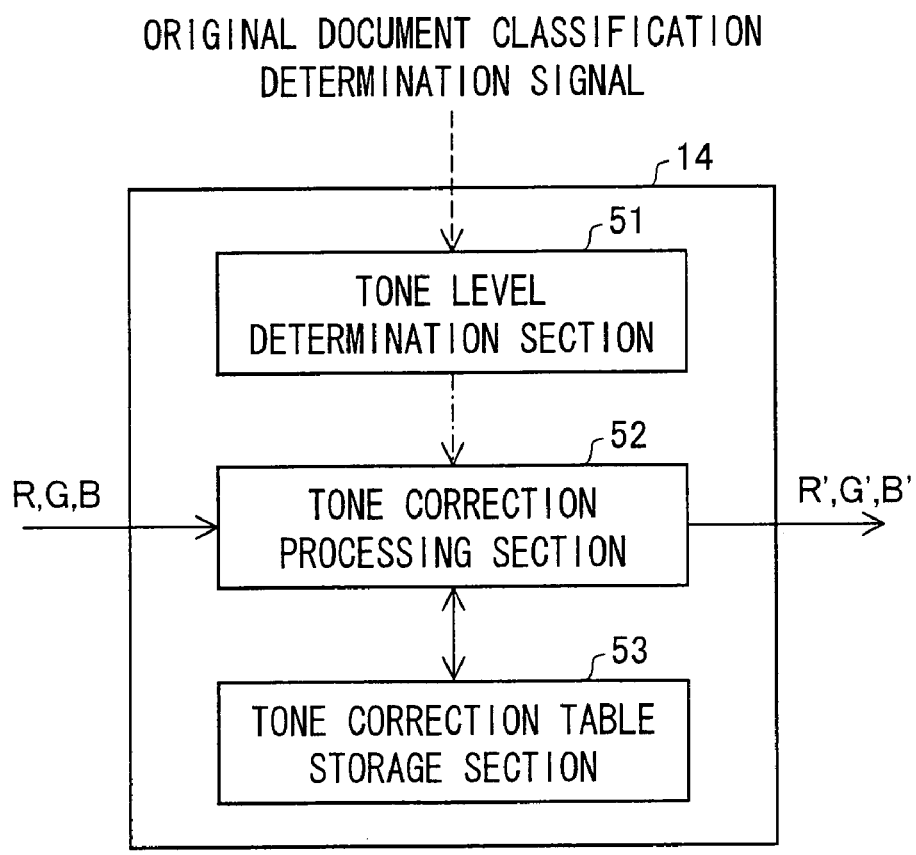
FIG. 13 is a block diagram illustrating an arrangement of an input tone correction section included in the image processing device illustrated in FIG. 2.

FIG. 13 is a block diagram illustrating a structure of the input tone correction section 14. As illustrated in FIG. 13, the input tone correction section 14 includes a tone level determination section (tone determination section) 51, a tone correction processing section 52, and a tone correction table storage section (page-background color removal table storage section) 53.

The tone level determination section 51 receives an original document classification determination signal indicating the determination result of the automatic original document classification determining section 13. The tone level determination section 51 sorts a tone level of a block (block made of plural pixels including one target pixel) which has been determined to belong to the page-background region into either one of a plurality of tone levels (in this embodiment, 17 levels from TS16 through TS32), on the basis of the original document classification determination signal, and outputs the result of this sort to the tone correction processing section 52.

A method explained here is a method for sorting the tone levels in the tone level determination section 51. The Tables 1 through 3 illustrate a relationship between (i) tones of RGB components of image data of the page-background region which image data is supplied to the input tone correction section 14 and (ii) tone levels into which each tone is sorted.

TABLE 1

| R | R-G | R-B | TONE LEVEL |
|---|---|---|---|
| R ≧ 230 | R-G ≧ 20 | R-B ≧ 20 | TS16 |
| R ≧ 230 | R-G ≧ 16 | R-B ≧ 16 | TS17 |
| R ≧ 230 | R-G ≧ 12 | R-B ≧ 12 | TS18 |
| R ≧ 230 | R-G ≧ 8 | R-B ≧ 8 | TS19 |

TABLE 2

| Rmax | Gmin | R-G | R-B | TONE LEVEL |
|---|---|---|---|---|
| Rmax ≧ 235 | Gmin ≧ 231 | R-G < 4 | R-B < 4 | TS20 |
| Rmax ≧ 243 | Gmin ≧ 236 | R-G < 4 | R-B < 4 | TS21 |
| Rmax ≧ 247 | Gmin ≧ 244 | R-G < 4 | R-B < 4 | TS22 |

TABLE 3

| B | R-B | G-B | TONE LEVEL |
|---|---|---|---|
| B ≧ 230 | R-B ≧ 20 | G-B ≧ 20 | TS23 |
| B ≧ 230 | R-B ≧ 16 | G-B ≧ 16 | TS24 |
| B ≧ 230 | R-B ≧ 12 | G-B ≧ 12 | TS25 |
| B ≧ 230 | R-B ≧ 8 | G-B ≧ 8 | TS26 |

As illustrated in Table 1, in a case where signals corresponding to RGB components of the pixels in the block mentioned above satisfy all of R≧230, R-G≧20, and R-B≧20, the tone level of the block including the pixels is sorted into TS16. Similarly, in a case where the signals corresponding to the RGB components of the pixels in the block mentioned above satisfy all of R≧230, R-G≧16, and R-B≧16, the tone level of the block including the pixels is sorted into TS17; in a case where the signals corresponding to the RGB components of the pixels in the block mentioned above satisfy all of R≦230, R-G≦12, and R-B≦12, the tone level of the block including the pixels is sorted into TS18; and in a case where the signals corresponding to the RGB components of the pixels in the block mentioned above satisfy all of R≦230, R-G≧8, and R-B≧8, the signals are sorted into TS19. The page-background colors sorted into TS16 through TS19 are pinks.

As illustrated in Table 2, in a case where the signals corresponding to the RGB components of the pixels in the block mentioned above satisfy all of Rmax≧235, Gmin≧231, R-G<4, and R-B<4, the tone level of the block including the pixels is sorted into TS20; in a case where the signals corresponding to the RGB components of the pixels in the block mentioned above satisfy all of Rmax≧243, Gmin≧236, R−G<4, and R−B<4, the tone level of the block including the pixels is sorted into TS21; and in a case where the signals corresponding to the RGB components of the pixels in the block mentioned above satisfy all of Rmax≧247, Gmin≧244, R−G<4, and R−B<4, the tone level of the block including the pixels is sorted into TS22. The page-background colors sorted into TS20 through TS22 are grays.

As illustrated in Table 3, in a case where the signals corresponding to the RGB components of the pixels in the block mentioned above satisfy all of B≧230, R−B≧20, and G−B≧20, the tone level of the block including the pixels is sorted into TS23; in a case where the signals corresponding to the RGB components of the pixels in the block mentioned above satisfy all of B≧230, R−B≧16, and G−B≧16, the tone level of the block including the pixels is sorted into TS24; in a case where the signals corresponding to the RGB components of the pixels in the block mentioned above satisfy all of B≧230, R−B≧12, and G−B≧12, the tone level of the block including the pixels is sorted into TS25; and in a case where the signals corresponding to the RGB components of the pixels in the block mentioned above satisfy all of B≧230, R−B≧8, and G−B≧8, the tone level of the block including the pixels is sorted into TS26. The page-background colors sorted into TS23 through TS26 are yellows.

Page-background colors that are not sorted into TS16 through TS27 are whites. The image data made of such white page-background colors are sorted into TS28 through TS32 on the basis of a tone level of RGB components. A method of sorting the tone levels into TS28 through TS32 may be arbitrarily set.

Figure 14:
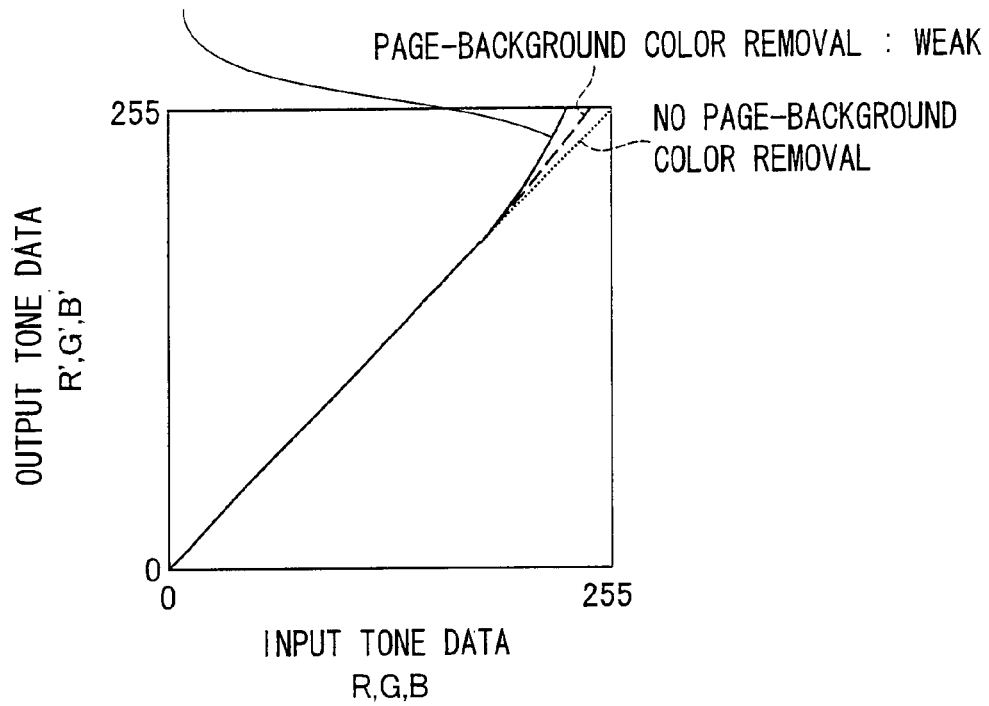
FIG. 14 is a graph illustrating one example of a page-background -color removal table used by the input tone correction section illustrated in FIG. 13.

The tone correction table storage section 53 stores a plurality of page-background color removal tables which are provided so as to respectively correspond to the tone levels (TS16 through TS32) sorted as mentioned above. According to the tone levels, each of the page-background color removal tables is made up of (a) input image data and (b) corresponding output image data obtained after page-background colors are removed from the input image data, both of which are associated with each other. FIG. 14 is a graph illustrating an example of the page-background color removal table (γ curve). In this embodiment, a common table is used for all RGB data of each tone level. However, this is the only possibility of the present invention. Alternatively, a table may be prepared for each individual RGB data.

On the basis of a result of the sorting by the tone level determination section 51, the tone correction processing section 52 selects a table corresponding to the level into which the tone level has been sorted, among the page-background color removal tables stored in the tone correction table storage section 53. Then, the tone correction processing section 52 converts the image data (R, G, B) received from the automatic original document classification determining section 13 to output image data (R', G', B'), with reference to the table selected, and outputs the output image data to the region separation processing section 15. In a case where the tone level determination section 51 receives an original document classification determination signal other than the signal of the page-background region, for example, the tone level determination section 51 may be arranged to output the received original document classification determination signal to the tone correction processing section 52 so that the tone correction processing section 52 selects the tone correction table corresponding to the original document classification and carries out the tone correction processing.

(1-4. Color Correction Section 16)

Figure 15:
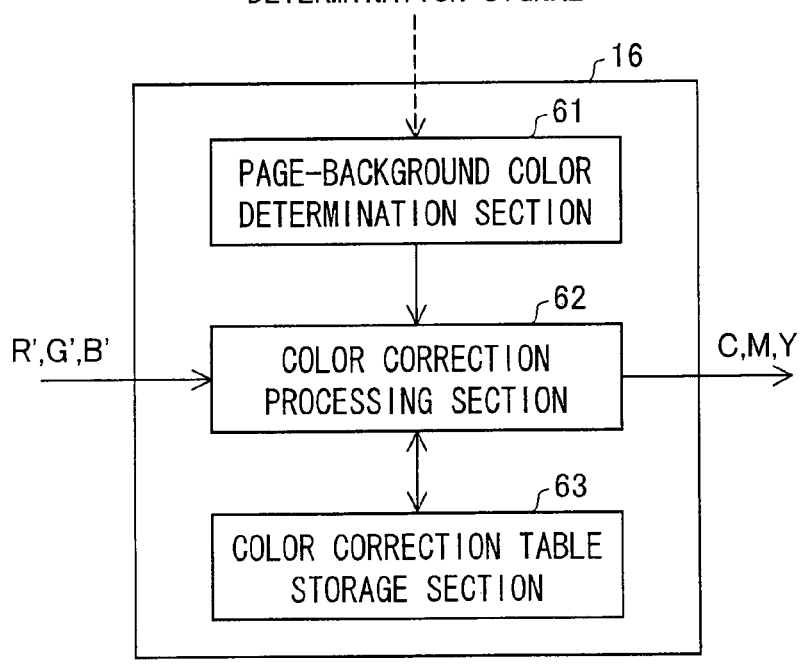

FIG. 15 is a block diagram illustrating an arrangement of the color correction section 16. As illustrated in this figure, the color correction section 16 includes a page-background color determination section (page-background color determination section) 61, a color correction processing section (color correction processing section) 62, and the color correction table storage section 63.

The page-background color determination section 61 receives the original document classification determination signal indicating a determination result of the automatic original document classification determining section 13. On the basis of this original document classification determination signal, the page-background color determination section 61 sorts the block (block that is made up of plural pixels including one target pixel) that has been determined to belong to the page-background region into either one of plural groups, according to a color group of the page-background color. In the present embodiment, the page-background color determination section 61 sorts the tone level of the above-mentioned block into either one of seventeen levels, TS16 through TS32, in the same manner as the tone level determination section 51 included in the above-mentioned tone correction section 14. Moreover, the page-background color determination section 61 further sorts the blocks sorted into TS23 to TS26 (yellow page-background colors) into a group A; the blocks sorted into TS20 to TS22 (gray page-background colors) into a group B; the blocks sorted into TS16 to TS19 (pink page-background colors) into a group C, and the blocks sorted into TS27 to TS32 (white page-background colors) into a group D. Consequently, the page-background color determination section 61 outputs a result of this sort to the color correction processing section 62.

Figure 16:
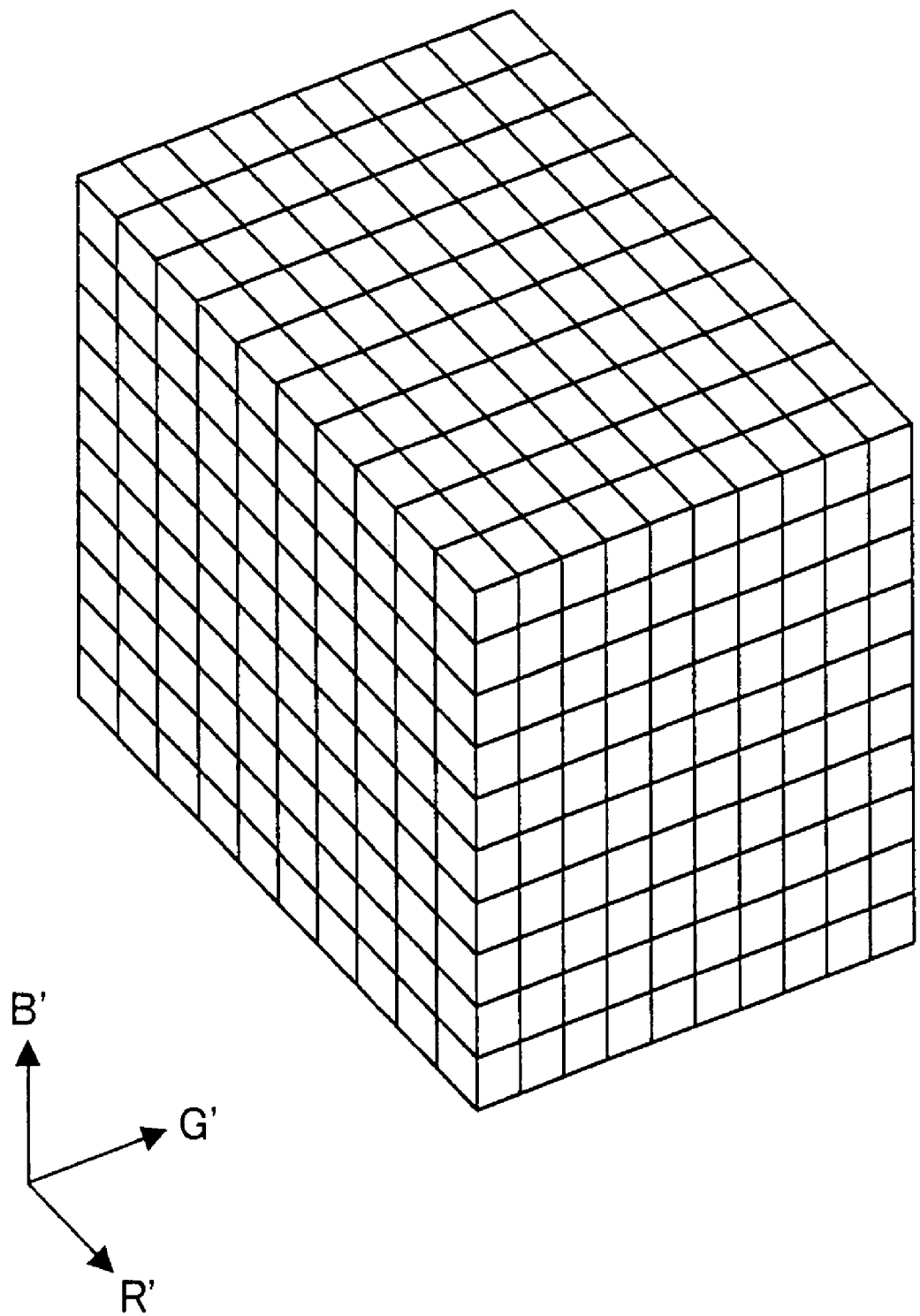
FIG. 16 is an explanatory diagram illustrating a color correction table stored in the color correction section illustrated in FIG. 15.

The color correction table storage section 63 stores a plurality of color correction tables (color correction/color conversion tables) provided so that the tables respectively correspond to the groups mentioned above. FIG. 16 is an explanatory diagram illustrating a concept of the color correction tables stored in the color correction table storage section 63. As illustrated in FIG. 16, the color correction tables can be presented in three-dimensions having R', G', and B' axes. Addresses specified by values of R', G', and B' respectively store values of C, M, and Y, which are color data after the conversion. Namely, use of these color correction tables makes it possible to convert the image data including colors in a first color space made of RGB into the image data including colors in a second color space made of CMY.

The data of each color correction table is set for each group so that the color taste of a color that remains after the page-background color removal processing does not change extremely, in other words, so that the page-background color removal processing causes only a small change of a color other than the page-background color. For example, data on the color correction tables is set for each page-background color so that the color of a light color image on an original document can be reproduced faithfully even in a case where image data read from the original document on which the light color image is formed on a deep page-background color is subjected to page-background density removal by the input tone processing and then subjected to color correction.

(1-5. Page-Background Color Removal Processing and Color Correction Processing)

Figure 17:
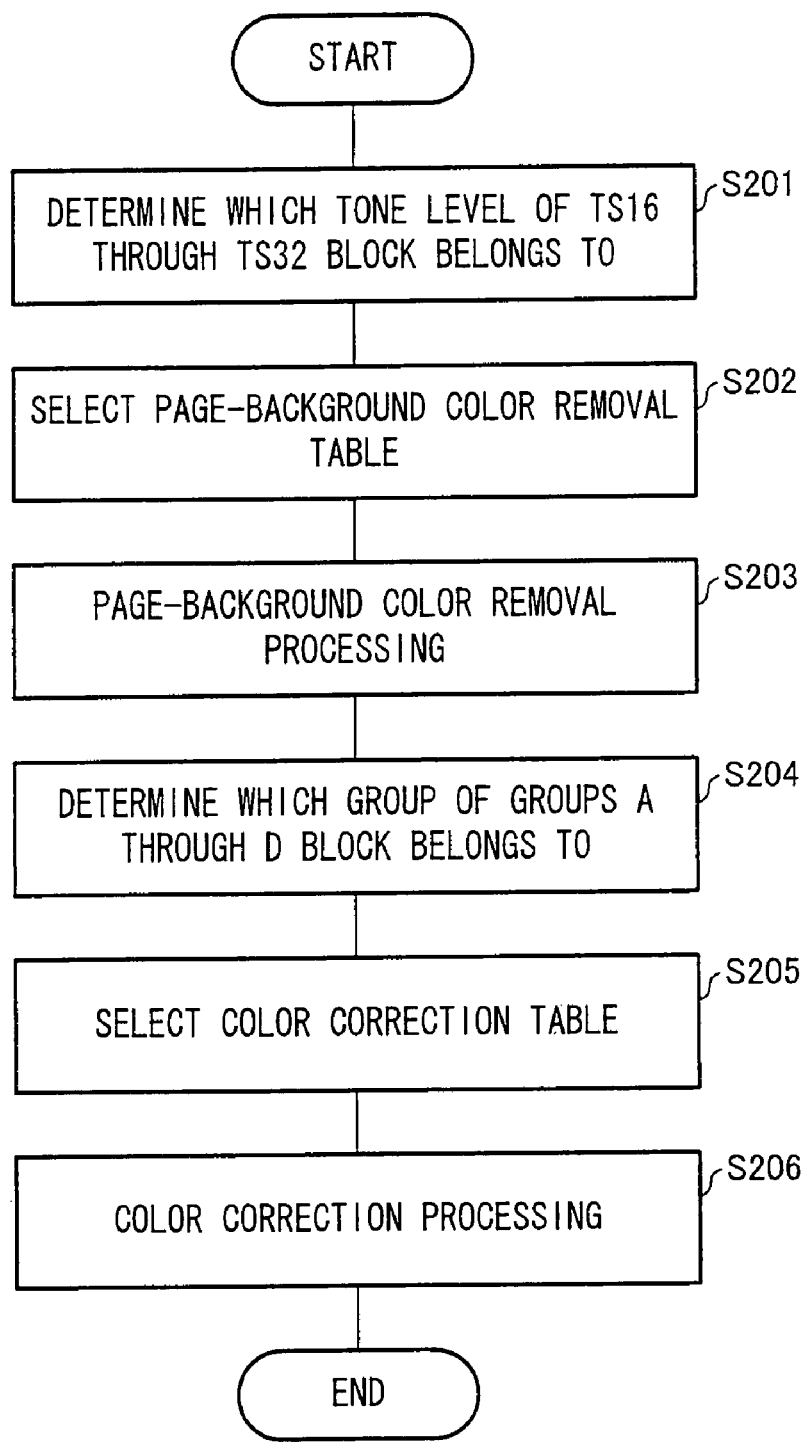
FIG. 17 is a flow chart illustrating page-background color removal processing and color correction processing in the image processing device illustrated in FIG. 2.

Next, the page-background color removal processing performed by the input tone correction section 14 and the color correction processing performed by the color correction section 16 are explained with reference to FIG. 17. FIG. 17 is a flow chart illustrating a flow of the page-background color removal processing and the color correction processing.

When image data (R, G, B) and an original document classification determination signal is inputted into the input tone correction section 14 from the automatic original document classification determining section 13, the tone level determination section 51 determines which tone level among TS16 through TS32 the block that belongs to the page-background region belongs to (S201), as illustrated in FIG. 17. Moreover, the tone level determination section 51 outputs to the tone correction processing section 52 a signal indicating a determination result, namely, a signal indicating which tone level among TS16 through TS23 the target block belongs to.

Next, the tone correction processing section 52 selects a page-background color removal table corresponding to the tone level indicated by the determination result of the tone level determination section 51 (S202). Then, the tone correction processing section 52 corrects the input image data (R, G, B) of the above-mentioned block to the output image data (R', G', B'), on the basis of the page-background color removal table selected, and removes the page-background color (S203). Consequently, the tone correction processing section 52 outputs the output image data (R', G', B') to the region separation processing section 15. The explanation on processing carried out by the region separation processing section 15 is omitted here.

The page-background color determination section 61 of the color correction section 16, which receives the image data (R', G', and B') from the region separation processing section 15, determines which group among groups A through D the block belongs to and outputs the determination result to the color correction processing section 62 (S204).

The color correction processing section 62 selects a color correction table corresponding to the group indicated by the determination result of the page-background color determination section 61 (S205). Then, the color correction processing section 62 corrects the input image data (R', G', B') to the output image data (C, M, Y) on the basis of the color correction table selected (S206).

FIG. 1 is an explanatory diagram illustrating a method of selecting a look-up table (page-background color removal table and color correction table) for the page-background color removal processing performed by the input tone correction section 14 and the color correction processing performed by the color correction section 16. As illustrated in FIG. 1, the page-background color removal processing is carried out by using a page-background color removal table (of LUT16 through LUT32), which corresponds to a tone level (of tone levels TS16 through TS32) indicated by the determination result of the tone level determination section 51, and the color correction processing is carried out by using a color correction table (of LUT-A through LUT-D) which corresponds to a group (of groups A through D) indicated by the determination result of the page-background color determination section 61.

As mentioned above, the color image processing device 2 of the present embodiment includes the color correction table storage section 63 storing the plurality of color correction tables and the page-background color determination section 63 determining a page-background color on the basis of the image data. The color image processing device 2 is arranged so as to select a color correction table to be used for the color correction processing on the basis of the determination result of the page-background color determination section 61. Moreover, the color correction tables are set so as to respectively correspond to color groups of the page-background colors so that the page-background color removal processing causes only a small change in the color taste of the color that remains after the page-background color removal processing. This makes it possible to suppress a change of a color other than the page-background color due to the page-background color removal processing and to improve the color reproducibility.

In the present embodiment, the tone level determination section 51 provided in the input tone correction section 14 determines the tone level of the block that belongs to the page-background region, and the page-background color determination section 61 provided in the color correction section 16 determines a color group (group) of the block that belongs to the page-background region. However, the present embodiment is not limited to this, but includes other arrangements, for example, an arrangement in which the tone level determination section 51 determines both the tone level and the color group of the block.

Moreover, the present embodiment explained above includes four color correction tables respectively corresponding to the groups A through D. However, the present embodiment is not limited to this, but may have any arrangement that includes at least two color correction tables. As the number of the color correction tables increases, the color reproducibility can be improved; however, storage capacity required in the color correction table storage section 63 becomes large. Therefore, the number of the color correction tables may be arbitrarily set in consideration of color reproducibility required, and cost and the like of a memory used as the color correction table storage section 63.

Furthermore, the present embodiment may have a color correction table which stores sets of output image data respectively corresponding to all sets of input image data (direct conversion method). The present embodiment may also have a color correction table which stores sets of output image data respectively corresponding to sets of input image data partially selected so that output image data is obtained by an interpolating calculation for color correction of input image data that is not stored in the table (table interpolation method). In a case of adopting the table interpolation method, it is possible to decrease the capacity of the memory used as the color correction table storage section 63 and thus reduce cost.

In the present embodiment, a table is used as a color correction table so that the color correction and the color conversion are performed concurrently. However, the present embodiment is not limited to this, but separate tables may be used to perform the color correction and the color conversion respectively.

In addition, the blocks of the color image processing device 2 of the present embodiment are, as mentioned above, realized by software by means of a processor such as a CPU (Central Processing Unit).

In other words, the color image processing device 2 includes a CPU that executes an order of a control program for realizing the aforesaid functions, ROM (Read Only Memory) that stores the control program, RAM (Random Access Memory) that expands the control program, a storage device (storage medium), such as memory, that stores the control program and various kinds of data therein. The object of the present invention is achieved by a storage medium. The storage medium stores, in computer-readable manner, program codes (executable code program, intermediate code program, and source program) of the control program of the color image processing device 2, which is software for realizing the aforesaid functions. The storage medium is provided to the color image processing device 2. With this arrangement, the color image processing device 2 (alternatively, CPU or MPU) as a computer reads out and executes program code stored in the storage medium provided.

Examples of the storage medium mentioned above include a tape, such as a magnetic tape and a cassette tape; a magnetic disk, such as a floppy disk (Registered Trademark) and a hard disk; a disc including an optical disk, such as a CD-ROM, MO, MD, DVD, and CD-R; a card, such as an IC card (inclusive of a memory card) and an optical card; and a semiconductor memory, such as a mask ROM, an EPROM (erasable programmable read only memory), an EEPROM (electrically erasable programmable read only memory), and a flash ROM.

Moreover, the color image processing device 2 may be arranged so as to be connectable to a communication network so that the program code is supplied to the color image processing device 2 via the communication network. This communication network is not specifically limited. Examples of the communication network include the Internet, intranet, extranet, LAN (Local Area Network), ISDN (Integrated Services Digital Network), VAN (Value Added Network), CATV (Cable TV) communication network, virtual private network, telephone line network, mobile communication network, and satellite communication network. Further, a transmission medium that constitutes the communication network is also not specifically limited. Example of the transmission medium include (i) wired lines such as IEEE (Institute of Electrical and Electronics) 1394, USB (Universal Serial Bus), power-line carrier, cable TV lines, telephone lines, and ADSL (Asymmetric Digital Subscriber Line) lines; and (ii) wireless connections, such as IrDA (Infrared Data Association) and remote control using infrared light, Bluetooth (Registered Trademark), 802.11, HDR (High Data Rate), mobile telephone network, satellite connections, and terrestrial digital network; The present invention can also be realized by the program cods in the form of a computer data signal embedded in a carrier wave which is embodied by electronic transmission.

The blocks of the color image processing device 2 in the present embodiment is not limited to an arrangement realized by software, but may be constituted by hardware logic.

According to the present invention, in order to solve the problem mentioned above, an image processing device which subjects image data read from an original document to image processing according to a page-background color of the original document, includes: a page-background color removal section which removes the page-background color from the image data; a page-background color determination section which sorts the image data into either one of a plurality of groups according to the page-background color of the original document; a plurality of color correction tables being provided so as to respectively correspond to respective page-background colors of the groups, each of the color correction tables having (a) image data before subjected to color correction and (b) image data after subjected to color correction, which are associated with each other; and a color correction processing section which subjects the image data to color correction by using a color correction table, among the color correction tables, corresponding to the group into which the image data is sorted by the page-background color determination section.

According to the above-mentioned arrangement, the image processing device includes a plurality of color correction tables which are provided so as to respectively correspond to respective page-background colors of the groups. This makes it possible to set the color correction tables, in consideration of influence of the page-background color removal processing on a color other than the page-background color in the image data for each of the groups of the original document page-background colors. Accordingly, the page-background color determination section sorts the image data into either one of the plurality of groups in accordance with the original document page-background color, and the color correction processing section carries out the color correction processing by using a color correction table corresponding to the group into which the image data is sorted. As a result, it becomes possible to suppress a change of a color other than the page-background color due to the page-background color removal processing and thus improve color reproducibility.

The image processing device of the present invention may be arranged such that the page-background color removal section includes: a tone determination section which sorts the image data into either one of plural tone levels according to a tone of the page-background color of the original document; and a plurality of page-background color removal tables, provided so as to respectively correspond to the tone levels, which has (i) image data before subjected to the page-background color removal and (ii) image data after subjected to the page-background color removal, which are associated with each other, and wherein: the page-background color removal is carried out by using a page-background color removal table, among the page-background color removal tables, corresponding the tone level into which the image data is sorted by the tone level determination section.

According to the above-mentioned arrangement, it is possible to set data of the page-background color removal tables so that the data of the page-background color removal tables respectively correspond to the tone levels of the page-background colors. Accordingly, the tone determination section sorts the image data into either one of the plurality of tone levels in accordance with tone of the original document page-background color, and the page-background color removal section performs page-background color processing by using the page-background color removal table corresponding to the tone level into which the image data is sorted. As a result, it is possible to appropriately and easily perform the page-background color removal processing according to a tone level of the page-background color.

The image processing device of the present invention may be arranged such that the color correction tables are set so that the page-background color removal causes only a small change of a color other than the page-background color in the image data.

According to the above-mentioned arrangement, it is possible to set the data stored in the color correction tables so that the page-background color removal causes only a small change of the color other than the page-background color. In other words, the color correction tables are set so as to respectively correspond to the page-background colors to be removed so that the page-background color removal processing causes only a small change in the color other than the page-background color. As a result, it becomes possible to reliably suppress the change in the color other than the page-background color due to the page-background color removal processing and to perform the color correction processing more appropriately according to the page-background color.

Moreover, the image processing device of the present invention may be arranged such that the color correction tables are set so as to allow image data including colors in the first color space to be converted into image data including colors in the second color space. In other words, the above-mentioned color correction tables may be set so that the color correction processing and the color conversion processing in which the image data including colors (for example, RGB) in the first color space is converted into the image data including colors (for example, CMY) in the second color space are concurrently carried out.

According to the above-mentioned arrangement, a common table can be used in both of the color correction processing and the color conversion processing. Therefore, an arrangement of the image processing device can be simplified.

The image processing device of the present invention may further include: an original document classification determination section for determining at least whether or not a block, which is made of a plurality of pixels including a target pixel in the image data, belongs to a page-background region, wherein: the page-background color removal section removes a page-background color of a block that has been determined to belong to the page-background region by the original document classification determination section; and the color correction processing section subjects the block that has been determined to belong to the page-background region by the original document classification determination section to the color correction.

According to the above-mentioned arrangement, the original document classification determination section determines whether or not the blocks of the image data belong to the page-background region, and the blocks in the page-background region are subjected to the page-background color removal processing and the color correction processing. As a result, the blocks in the page-background region can be appropriately subjected to the page-background color removal processing and the color correction processing. Moreover, blocks in regions other than the page-background region can be subjected to processing according to respective classifications of the regions.

According to the present invention, in order to solve the problem mentioned above, an image processing method of subjecting image data read from an original document to image processing according to a page-background color of the original document, includes: a page-background color removal step of removing the page-background color from the image data; a page-background color determination step of sorting the image data into either one of a plurality of groups according to the page-background color of the original document; and a color correction step of subjecting the image data to color correction by using a color correction table corresponding to the group into which the image data has been sorted in the page-background color determination step among a plurality of color correction tables being provided so as to respectively correspond to respective page-background colors of the groups, each of the color correction tables having (a) image data before subjected to color correction and (b) image data after subjected to color correction, which are associated with each other.

According to the above-mentioned method, the image data is subjected to color correction processing by using a color correction table corresponding to a group into which the page-background color is sorted by the page-background color determination section among the plurality of color correction tables provided to respectively correspond to the page-background colors of the groups. This makes it possible to set the color correction tables, in consideration of influence of the page-background color removal processing on a color other than the page-background color in the image data for each of the groups of the original document page-background colors. As a result, it becomes possible to suppress a change of a color other than the page-background color due to the page-background color removal processing and thus improve color reproducibility.

An image forming apparatus of the present invention includes either one of the above-mentioned image processing devices.

According to the above-mentioned arrangement, it is possible to form an image by using the image data which has been subjected to an appropriate color correction processing according to the page-background color while a change due to the page-background color removal processing is suppressed in the color other than the page-background color. As a result, it becomes possible to improve the color reproducibility of the original document image.

The image processing device of the present invention may be realized by a computer. In such a case, a scope of the present invention includes: an image processing program for causing a computer to operate as the functions mentioned above so as to cause the computer to realize the image processing device; and a computer-readable storage medium which stores the image processing program.

The present invention is applicable to a machine which needs to determine an original document classification. Examples of such a machine is a color copying machine, a flat bed scanner, a film scanner, and a digital camera.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing device which subjects image data read from an original document to image processing according to a page-background color corresponding to the of the original document, comprising:
    a page-background color removal section which removes the page-background color from the image data;
    a page-background color determination section which sorts the image data into either one of a plurality of groups according to the page-background color of the original document;
    a plurality of color correction tables being provided so as to respectively correspond to respective page-background colors of the groups, each of the color correction tables having (a) image data before subjected to color correction and (b) image data after subjected to color correction, which are associated with each other; and
    a color correction processing section which subjects the image data to color correction by using a color correction table, among the color correction tables, corresponding to the group into which the image data is sorted by the page-background color determination section,
    wherein said color correction tables are set so as to allow image data made of colors in a first color space to be converted into image data made of colors in a second color space.

2. The image processing device as set forth in claim 1, wherein:
    the page-background color removal section includes:
    a tone determination section which sorts the image data into either one of plural tone levels according to a tone of the page-background color of the original document; and
    a plurality of page-background color removal tables, provided so as to respectively correspond to the tone levels, which has (i) image data before subjected to the page-background color removal and (ii) image data after subjected to the page-background color removal, which are associated with each other, and wherein:

the page-background color removal is carried out by using a page-background color removal table, among the page-background color removal tables, corresponding the tone level into which the image data is sorted by the tone level determination section.

3. The image processing device as set forth in claim 1, wherein:

said color correction tables are set so that the page-background color removal causes only a small change of a color other than the page-background color in the image data.

4. The image processing device as set forth in claim 1, further comprising:

an original document classification determination section for determining at least whether or not a block, which is made of a plurality of pixels including a target pixel in the image data, belongs to a page-background region, wherein:

said page-background color removal section removes a page-background color of a block that has been determined to belong to the page-background region by the original document classification determination section; and said color correction processing section subjects the block that has been determined to belong to the page-background region by the original document classification determination section to the color correction.

5. The image processing device as set forth in claim 1, wherein:

the page-background color determination section sorts the image data into one of a plurality of groups corresponding respectively to a yellow page-background color, a gray page-background color, a pink page-background color, and a white page-background color.

6. An image processing method of subjecting image data read from an original document to image processing according to a page-background color of the original document, comprising:

a page-background color removal step of removing the page-background color from the image data;

a page-background color determination step of sorting the image data into either one of a plurality of groups according to the page-background color of the original document; and a color correction step of subjecting the image data to color correction by using a color correction table corresponding to the group into which the image data has been sorted in the page-background color determination step among a plurality of color correction tables being provided so as to respectively correspond to respective page-background colors of the groups, each of the color correction tables having (a) image data before subjected to color correction and (b) image data after subjected to color correction, which are associated with each other, wherein said color correction tables are set so as to allow image data made of colors in a first color space to be converted into image data made of colors in a second color space.

7. An image forming apparatus including:

an image processing device which subjects image data read from an original document to image processing according to a page-background color of the original document; and an image formation section which forms an image corresponding to the image data onto a recording material, wherein:

the image processing device includes:

a page-background color removal section which removes the page-background color from the image data;

a page-background color determination section which sorts the image data into either one of a plurality of groups according to the page-background color of the original document;

a plurality of color correction tables being provided so as to respectively correspond to respective page-background colors of the groups, each of the color correction tables having (a) image data before subjected to color correction and (b) image data after subjected to color correction, which are associated with each other; and a color correction processing section which subjects the image data to color correction by using a color correction table, among the color correction tables, corresponding to the group into which the image data is sorted by the page-background color determination section, wherein said color correction tables are set so as to allow image data made of colors in a first color space to be converted into image data made of colors in a second color space.

8. A computer-readable storage medium which stores an image processing program for operating an image processing device which subjects image data read from an original document to image processing according to a page-background color of the original document, the image processing device including:

a page-background color removal section which removes the page-background color from the image data;

a page-background color determination section which sorts the image data into either one of a plurality of groups according to the page-background color of the original document;

a plurality of color correction tables being provided so as to respectively correspond to respective page-background colors of the groups, each of the color correction tables having (a) image data before subjected to color correction and (b) image data after subjected to color correction, which are associated with each other; and a color correction processing section which subjects the image data to color correction by using a color correction table, among the color correction tables, corresponding to the group into which the image data is sorted by the page-background color determination section, wherein:

the image processing program causes a computer to function as the page-background color removal section, the page-background color determination section, and the color correction processing section, wherein said color correction tables are set so as to allow image data made of colors in a first color space to be converted into image data made of colors in a second color space.

* * * * *